United States Patent
Hsu et al.

(10) Patent No.: US 10,782,838 B2
(45) Date of Patent: Sep. 22, 2020

(54) MUTUAL CAPACITIVE TOUCH PANEL WITH NARROW BORDER HAVING TRANSPARENT WINDING SEGMENTS

(71) Applicant: ILI Technology Corp., Hsinchu County (TW)

(72) Inventors: Cheng-Hsien Hsu, Hsinchu County (TW); Tzu-Wei Liu, Hsinchu (TW); Hu-Chi Chang, Hsin-Chu Hsien (TW); Pei-Ju Hsieh, Hsin-Chu Hsien (TW)

(73) Assignee: ILI Technology Corp., Hsinchu County (TW)

( * ) Notice: Subject to any disclaimer, the term of this patent is extended or adjusted under 35 U.S.C. 154(b) by 0 days.

(21) Appl. No.: 16/395,246

(22) Filed: Apr. 26, 2019

(65) Prior Publication Data

US 2019/0339816 A1    Nov. 7, 2019

(30) Foreign Application Priority Data

May 3, 2018  (TW) .............................. 107114960 A
Jan. 2, 2019  (TW) .............................. 108100033 A

(51) Int. Cl.
*G06F 3/044* (2006.01)

(52) U.S. Cl.
CPC .......... *G06F 3/0445* (2019.05); *G06F 3/0446* (2019.05)

(58) Field of Classification Search
CPC .. G06F 3/04164; G06F 3/0418; G06F 3/0445; G06F 3/0446; G06F 3/0448
See application file for complete search history.

(56) References Cited

U.S. PATENT DOCUMENTS

| 2009/0262095 | A1 | 10/2009 | Kinoshita | |
| 2013/0293791 | A1 | 11/2013 | Abe | |
| 2015/0054782 | A1* | 2/2015 | Liu | G06F 3/044 345/174 |
| 2017/0024060 | A1* | 1/2017 | Seong | G06F 3/0416 |
| 2019/0018517 | A1* | 1/2019 | Chang | G06F 3/044 |

FOREIGN PATENT DOCUMENTS

| CN | 205318347 U | 6/2016 |
| TW | 201351236 A | 12/2013 |

* cited by examiner

*Primary Examiner* — Chun-Nan Lin
(74) *Attorney, Agent, or Firm* — Winston Hsu

(57) ABSTRACT

A touch panel is provided and includes a plurality of electrode strip sets, a plurality of transparent traces and a plurality of electrode series sets. The electrode strip sets include a first electrode strip set and a second electrode strip, and the first electrode strip set is disposed between the second electrode strip and a pad region. The transparent traces are disposed in a light-transmitting region, the transparent traces electrically connected to the first electrode strip set and the second electrode strip set include a winding segment respectively, and a length of the winding segment electrically connected to the first electrode strip set is longer than a length of the winding segment electrically connected to the second electrode strip set. The electrode series sets cross the electrode strip sets.

24 Claims, 17 Drawing Sheets

MUTUAL CAPACITIVE TOUCH PANEL WITH NARROW BORDER HAVING TRANSPARENT WINDING SEGMENTS

BACKGROUND OF THE INVENTION

1. Field of the Invention

The present invention relates to a touch panel, and more particularly, to a mutual capacitive touch panel.

2. Description of the Prior Art

A touch display device, formed of a display and a touch panel, has characteristic of human-machine interaction, which is capable of providing both touch and display functions and thus is widely applied in various electronic products including smart phones, GPS navigator systems, tablet computers and laptop computers. In various touch display devices, mutual capacitive touch panels have become main touch technology used in this art due to the advantages of great accuracy, multi-touch, long endurance and high touch resolution.

The mutual capacitive touch technology is to detect coupling capacitance variance generated by the electric charges on a touch object coupling a touch sensing unit when the touch object approaches or contacts the touch sensing unit on the touch panel, thereby determining a touch event occurs. A structural design of the mutual capacitive touch technology may be mainly categorized into two types, single layer electrode structure and double layer electrode structure. Since structural design and control algorithm of the double layer electrode structure is easier than those of the single layer electrode structure, the double layer electrode structure is commonly implemented in mid-to-high-end consumer electronic products. In conventional design of the double layer electrode structure, sensing series and driving series are extended along a horizontal direction and a vertical direction, respectively; thus, wires to be connected to the sensing series have to be connected to the sensing series from two sides of the sensing series. For this reason, widths of peripheral regions on two sides of the touch panel in the horizontal direction are limited by the number of the wires and cannot be further reduced. Hence, to keep decreasing border width of the touch panel and even to be bezel-less is an objective of technician in the related art.

SUMMARY OF THE INVENTION

It is an objective of the present invention is to provide a touch panel to reduce the border width and raising visual effect.

According to an embodiment of the present invention, a touch panel is disclosed. The touch panel has a light-transmitting region and an opaque region, in which the opaque region includes a pad region disposed on a first side of the light-transmitting region, and the touch panel includes a plurality of electrode strip sets, a plurality of first transparent traces, and a plurality of electrode series sets. The electrode strip sets are disposed in the light-transmitting region and extends along a first direction, in which the electrode strip sets include a first electrode strip set and a second electrode strip set, and the first electrode strip set is disposed between the second electrode strip set and the pad region. The first transparent traces are disposed in the light-transmitting region, each first transparent trace includes a resistance adjusting portion, electrically connected to an end of one of the electrode strip sets, and each of the resistance adjusting portions connected to the first electrode strip set and the second electrode strip set includes a winding segment, in which a length of the winding segment electrically connected to the first electrode strip set is longer than a length of the winding segment electrically connected to the second electrode strip set. The electrode series sets are disposed in the light-transmitting region and extends along a second direction different from the first direction, and the electrode series sets cross the electrode strip sets.

According to another embodiment of the present invention, a touch panel is disclosed. The touch panel has a light-transmitting region and an opaque region, and the touch panel includes a plurality of electrode strip sets, a plurality of first transparent traces, and a plurality of electrode series sets. The electrode strip sets are disposed in the light-transmitting region and extend along a first direction. The first transparent traces are disposed in the light-transmitting region, each first transparent trace connected to an end of one of the electrode strip sets, in which each first transparent trace includes a lead portion extending into the opaque region along a second direction different from the first direction, one of the lead portions includes a first part and a second part, and a width of the first part in the first direction is different from a width of the second part in the first direction. The electrode series sets are disposed in the light-transmitting region and extend along the second direction, and the electrode series sets crossing the electrode strip sets.

According to another embodiment of the present invention, a touch panel is disclosed. The touch panel has a light-transmitting region and an opaque region, the opaque region includes a pad region disposed on a first side of the light-transmitting region, and the touch panel includes a plurality of electrode strip sets, a plurality of first transparent traces, a plurality of first opaque traces, a plurality of electrode series sets, and a plurality of second opaque traces. The electrode strip sets are disposed in the light-transmitting region and extend along a first direction, in which the electrode strip sets include a first electrode strip set and a second electrode strip set, and the first electrode strip set is disposed between the second electrode strip set and the pad region. The first transparent traces are disposed in the light-transmitting region, and each first transparent trace is electrically connected to an end of one of the electrode strip sets. The first opaque traces are disposed in the opaque region on the first side of the light-transmitting region, and each first opaque trace is connected to an end of a corresponding one of the first transparent traces, in which each first opaque trace and the corresponding one of the first transparent traces have a first connecting region, and the first connecting regions are arranged along the first direction. The electrode series sets are disposed on the light-transmitting region and extend along a second direction, and the electrode series sets cross the electrode strip sets. The second opaque traces are disposed in the opaque region on the first side of the light-transmitting region. Each electrode series set includes a first electrode series and a second electrode series, each second opaque trace is electrically connected to one of the first electrode series and the second electrode series, each second opaque trace and one of a corresponding one of the first electrode series and a corresponding one of the second electrode series have a second connecting region, and one of the second connecting regions overlaps one of the first connecting regions.

In the touch panel of the present invention, the transparent traces electrically connected to the electrode strip sets respectively are formed of transparent conductive materials, so that the transparent traces can be disposed in the light-transmitting region. Thus, the width of the light-transmitting region can be increased, and the number of opaque traces disposed on the left and right sides of the light-transmitting region can be reduced, thereby reducing the width of the opaque region and the border width of touch panel. In addition, since transparent traces made of transparent conductive materials are easy to have obviously different equivalent resistances due to different lengths, the difference between the equivalent resistances of the transparent traces is obvious. For this reason, in the touch panel of the present invention, by means of designing the length of the winding segment of one of the transparent trace connected to the electrode strip set closer to the first side and/or the second side of the light-transmitting region to be longer than the length of the winding segment of another one of the transparent traces connected to the electrode strip set farther from the first side and/or the second side of the light-transmitting region, the difference between the equivalent resistances of the lead portions of the transparent traces can be compensated, thereby uniforming the equivalent resistances of the transparent traces.

These and other objectives of the present invention will no doubt become obvious to those of ordinary skill in the art after reading the following detailed description of the preferred embodiment that is illustrated in the various figures and drawings.

DETAILED DESCRIPTION

In order to enable those skilled in the art to further understand the present invention, preferred embodiments of the present invention are listed below, and the composition and intended effects of the present invention will be described in detail with reference to the accompanying drawings. It should be noted that the drawings are simplified schematic diagrams, therefore, only the components and combination relationships related to the present invention are shown to provide a clearer description of the basic architecture or implementation method of the present invention, while the actual components and layout may be more complicated. In addition, for convenience of explanation, the elements shown in the various drawings of the present invention are not drawn to the actual number, shape and size, and the detailed scale can be adjusted according to the design requirements.

Figure 1:
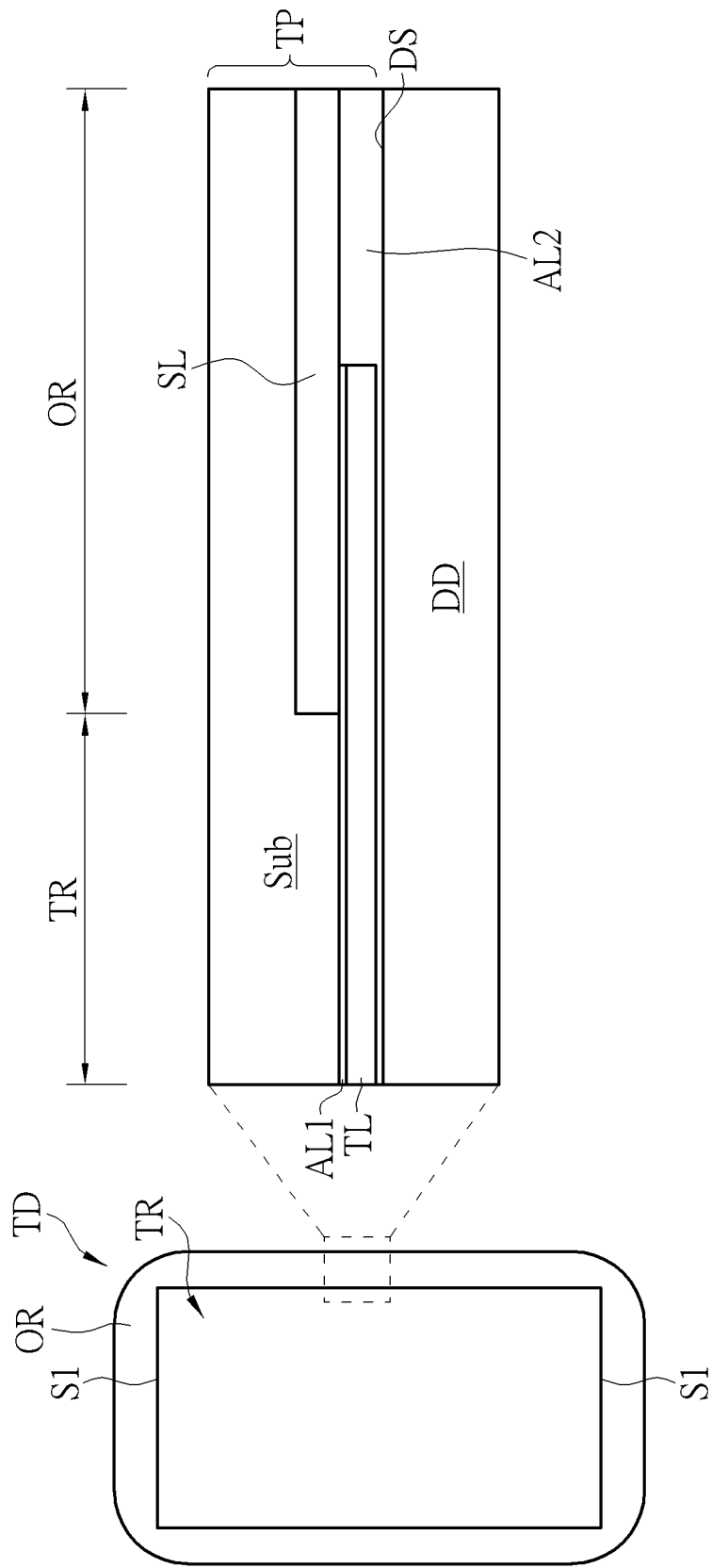
FIG. 1 schematically illustrates a touch display device to which the touch panel of the present invention is applied.

Please refer to FIG. 1, which schematically illustrates a touch display device to which a touch panel of the present invention is applied. As shown in FIG. 1, the touch panel TP of the present invention can be applied to a display device DD to form a touch display device TD. The touch panel TP can be disposed on a display surface DS of the display device DD to provide a touch sensing function. The touch panel TP may have a light-transmitting region TR and an opaque region OR, in which the light-transmitting region TR may allow light to pass through, thereby corresponding to a display region of the display device DD to allow a user to see an image displayed by the display device DD from the touch panel TP in the light-transmitting region TR, while the opaque region OR may block light from passing through, so the touch panel TP in the opaque region OR may be used to shield opaque traces in the touch panel TP and peripheral lines and bezels of the display device DD that are not used for displaying images. In one embodiment, the opaque region OR may surround the light-transmitting region TR, but the present invention is not limited thereto. In another embodiment, when two sides (e.g., a left side and a right side) of the touch panel TP reach borderless, the opaque region OR may be located on at least one of the first side S1 (e.g., an upper side) and the second side S2 (e.g., a lower side) of the light-transmitting region TR.

The touch panel TP may include, for example, a substrate Sub, a shielding layer SL and a touch layer TL, in which the shielding layer SL is disposed on the substrate Sub to define the opaque region OR, and the shielding layer SL has an opening to define the light-transmitting region TR. The substrate Sub may be the outmost substrate of the touch display device TD, and may include a rigid substrate or a flexible substrate, such as a glass substrate, a reinforced glass substrate, a quartz substrate, a sapphire substrate, a rigid cover lens, a plastic substrate, a flexible cover plate, a flexible plastic substrate, or a thin glass substrate. The touch layer TL is disposed on the substrate Sub and has the touch sensing function. The touch layer TL used herein may include, but is not limited to, a first transparent conductive layer and a second transparent conductive layer used to perform the touch sensing function, and an opaque conductive layer electrically connected to the first transparent conductive layer and the second transparent conductive layer. In this embodiment, the touch layer TL may be, for example, a film formed with touch elements, one surface of which may be adhered to the substrate Sub through the adhesive layer AL1, and the other surface of which may be adhered to the display device DD through another adhesive layer AL2, but not limited thereto. Those skilled in the art should know that the touch layer TL can also be directly formed on the substrate Sub or the display device DD and will not be redundantly described. The application of the touch panel TP of the present invention is not limited to FIG. 1 but may also be applied to other types of devices.

Figure 2:
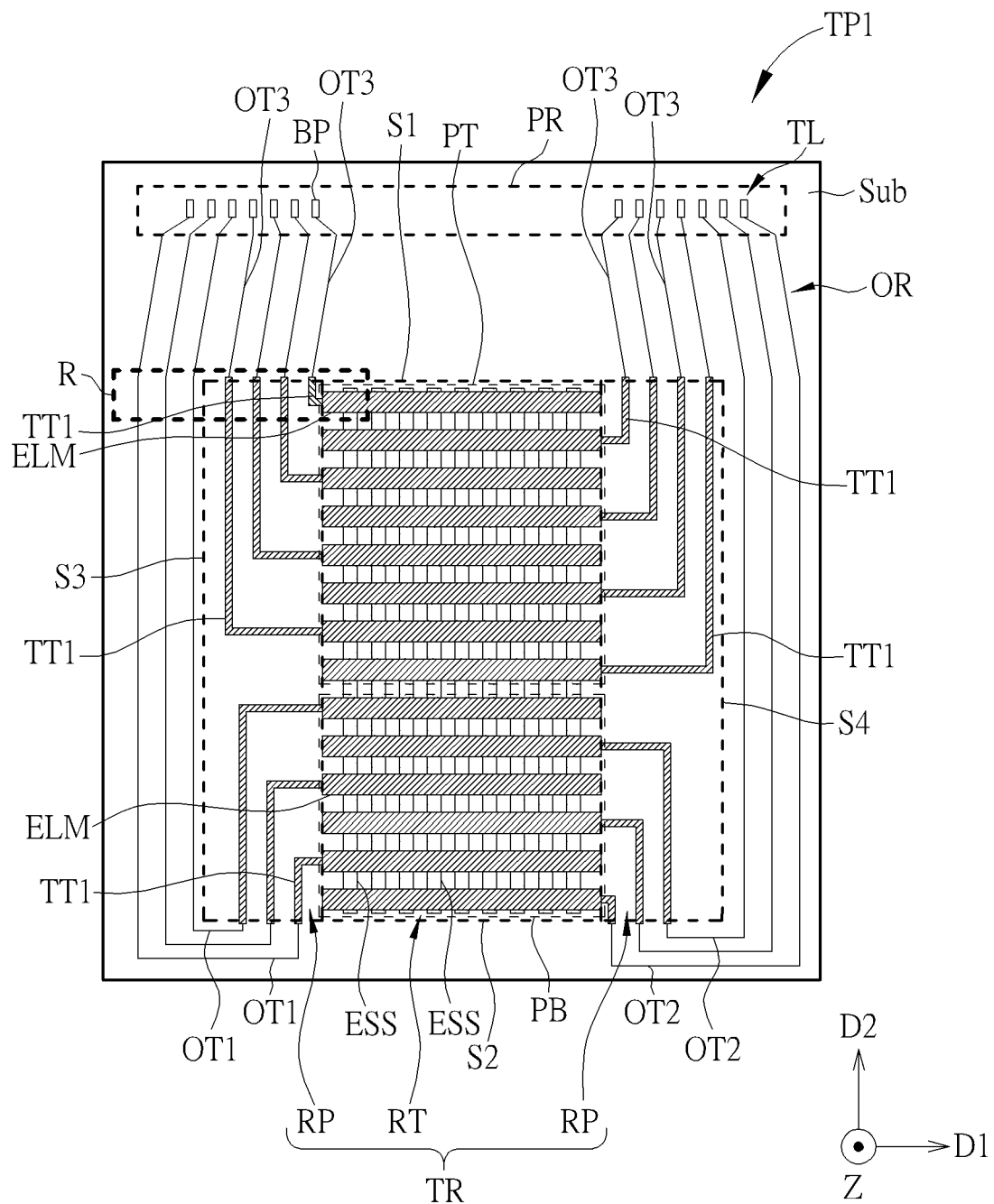
FIG. 2 schematically illustrates a top view of the touch panel according to the first embodiment of the present invention.

Please refer to FIG. 2, which schematically illustrates a top view of the touch panel according to the first embodiment of the present invention. As shown in FIG. 2, the light-transmitting region TR may include a touch region RT and two border regions RP. A part of the touch panel TP1 in the touch region RT has the touch sensing function, while another part of the touch panel TP1 in the peripheral region RP does not have the touch sensing function. The peripheral regions RP are respectively located on two sides of the touch region RT and are respectively adjacent to a third side S3 (e.g., the left side) and a fourth side S4 (e.g., the right side) of the light-transmitting region TR. The opaque region OR may include a pad region PR located on the first side S1 of the light-transmitting region TR for disposing pads BP, in which the pads BP may be electrically connected to a driving element for controlling the touch panel TP1.

In this embodiment, the touch panel TP1 is disposed in the touch region RT, and the part of the touch panel TP1 having the touch sensing function may include a plurality of electrode strip sets ELM, a plurality of first transparent traces TT1, and a plurality of electrode series sets ESS, which are disposed on the substrate Sub in the light-transmitting region TR. Each electrode strip set ELM extends along a first direction D1, and each electrode series set ESS extends along a second direction D2 different from the first direction D1, so that each electrode series set ESS can be insulated from and cross each electrode strip set ELM to generate capacitive coupling, thereby enabling the touch panel TP1 to have the touch sensing function. To make the electrode strip set ELM and the electrode series set ESS transparent, the electrode strip set ELM may be formed of a first transparent conductive layer and the electrode series set ESS may be formed of a second transparent conductive layer. For example, the first transparent conductive layer may be located between the substrate Sub and the second transparent conductive layer. The first transparent conductive layer and the second transparent conductive layer may respectively include transparent conductive materials, such as indium tin oxide (ITO), indium zinc oxide (IZO), antimony tin oxide, (ATO), antimony zinc oxide, (AZO), nano-silver or other suitable transparent conductive materials. For example, the first transparent conductive layer and the second transparent conductive layer may be respectively formed on two different films, and the two films are adhered to each other through an adhesive layer, such that the first transparent conductive layer is electrically insulated from the second transparent conductive layer through the film and the adhesive layer as an insulating layer, but the present invention is not limited thereto. In another embodiment, the insulating layer can be an insulating layer formed by a deposition process, so that the first transparent conductive layer, the insulating layer and the second transparent conductive layer can be sequentially deposited on a surface of a same film. Alternatively, the first transparent conductive layer and the second transparent conductive layer are respectively deposited on different surfaces of the film, thereby taking the film as the insulating layer.

Each first transparent trace TT1 is located in the peripheral region RP and is respectively connected to an end of one of the electrode strip sets ELM for electrically connecting each electrode strip set ELM to a corresponding pad BP. The first transparent trace TT1 and the electrode strip set ELM in this embodiment may be formed of the same first transparent conductive layer, but the present invention is not limited thereto. In another embodiment, the first transparent trace TT1 and the electrode strip set ELM may also be formed of different transparent conductive layers. Since each first transparent trace TT1 is formed of a transparent conductive material, the first transparent traces TT1 do not affect the display of the image and can be located in the light-transmitting region TR, that is, the first transparent traces TT1 are located in the display region of the display device DD in a top view direction Z. In addition, since the first transparent traces TT1 for electrically connecting the electrode strip sets ELM to the pads BP can be disposed in the light-transmitting region TR, the number of the opaque traces disposed in the opaque region OR on the third side S3 (e.g., the left side) and the fourth side S4 (e.g., the right side) of the light-transmitting region TR can be reduced, thereby reducing the width of the opaque region OR and reducing the border width of the touch panel TP1 (the width of the opaque region OR on the left and right sides of the light-transmitting region TR).

Figure 3:
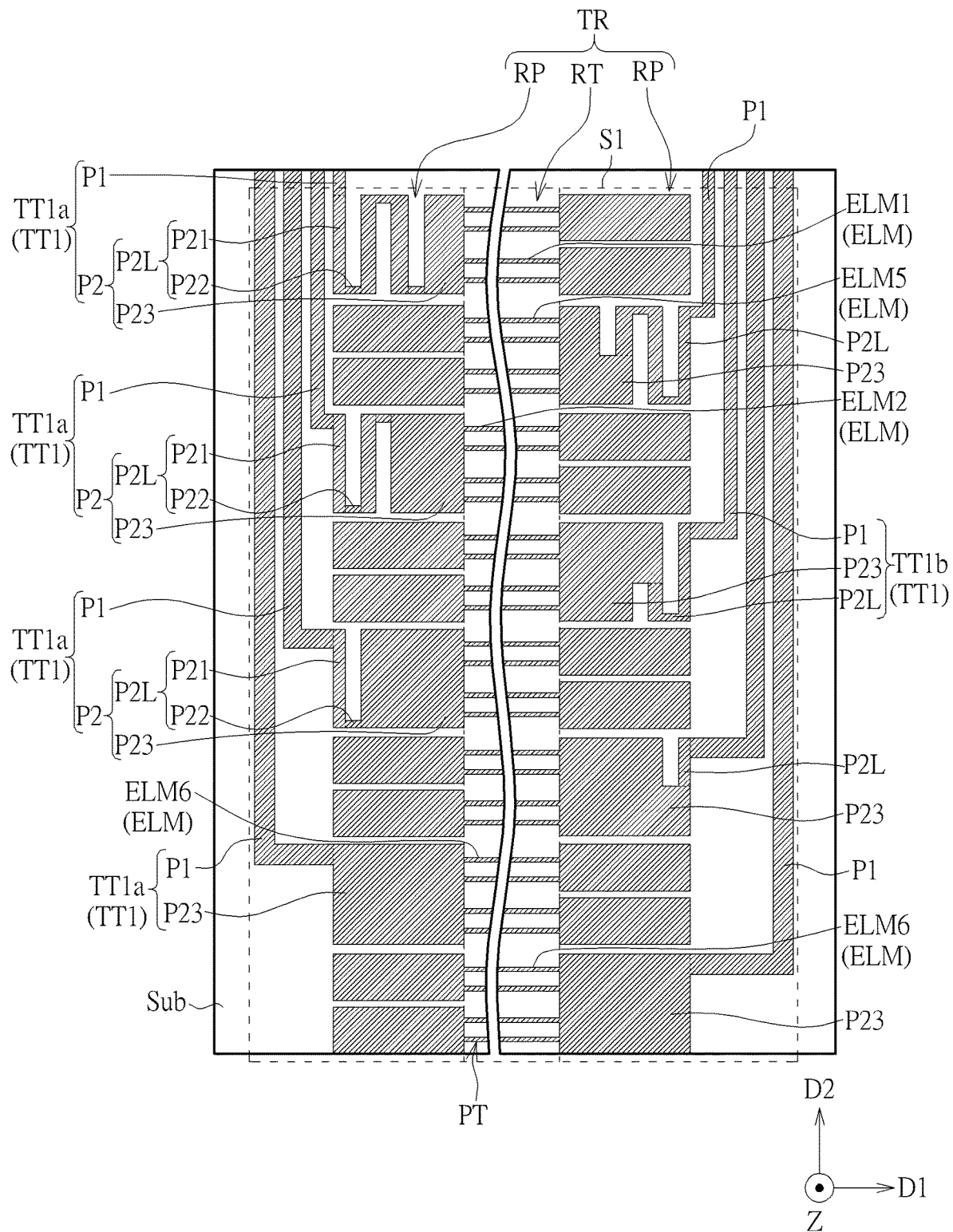
FIG. 3 schematically illustrates a top view of the transparent traces connected to the electrode strip sets of the upper part according to the first embodiment of the present invention.
Figure 4:
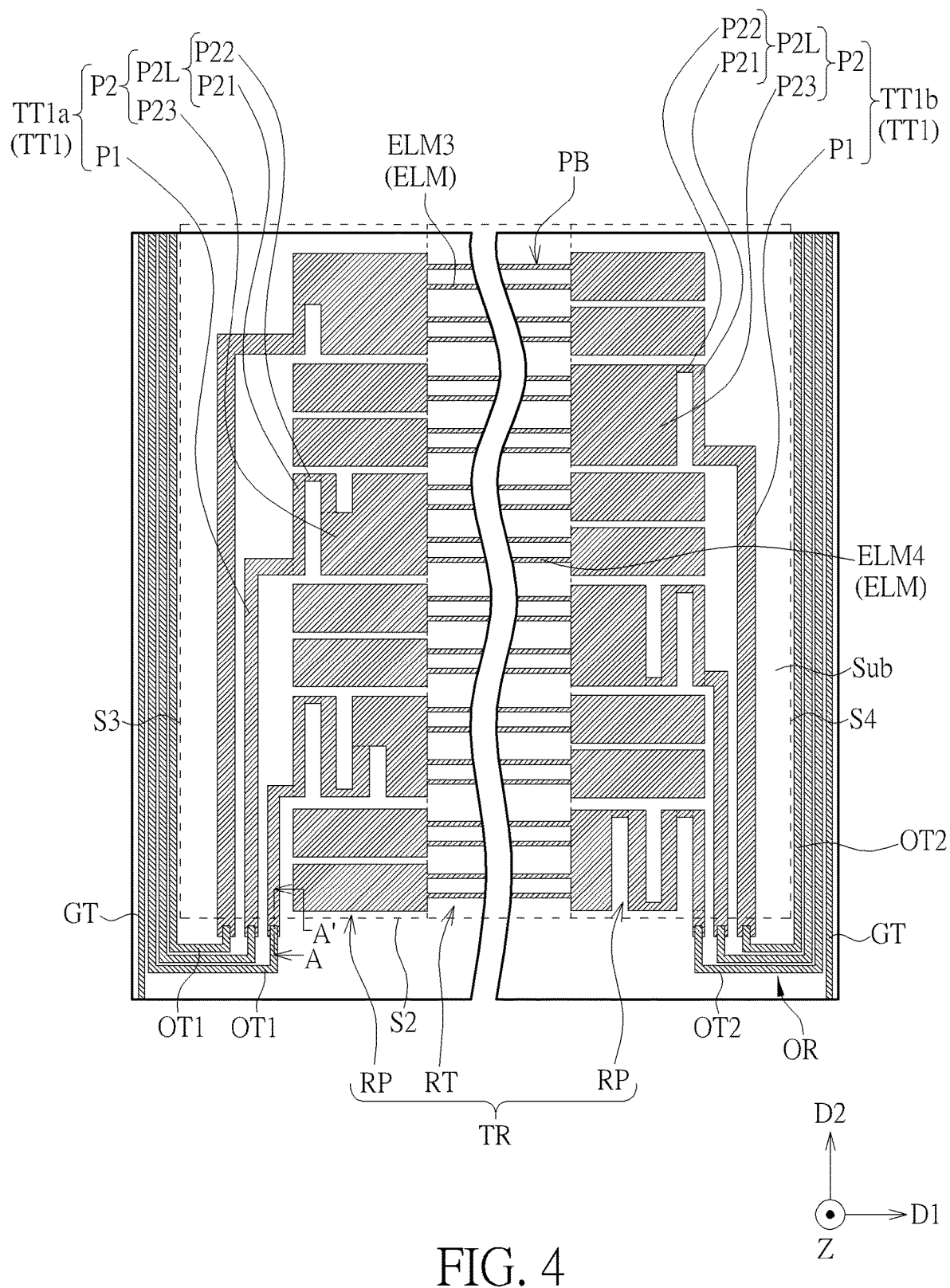
FIG. 4 schematically illustrates a top view of the transparent traces connected to the electrode strip sets of the lower part according to the first embodiment of the present invention.

In this embodiment, the electrode strip sets ELM are grouped into an upper part PT and a lower part PB. Each first transparent trace TT1 connected to one of the electrode strip sets ELM in the upper part PT extend from an end of the corresponding electrode strip set ELM to the first side S1 of the light-transmitting region TR, and each first transparent trace TT1 connected to one of the electrode strip sets ELM in the lower part PB extends from an end of the corresponding electrode strip set ELM to the second side S2 of the light-transmitting region TR opposite to the first side S1. With this arrangement, each first transparent trace TT1 can extend to the opaque region OR with the shortest length, thereby having lower equivalent resistance. Taking 14 electrode strip sets ELM as an example, 8 electrode strip sets ELM from the first side S1 of the light-transmitting region TR can be regarded as the upper part PT, while the remaining 6 electrode strip sets ELM are the lower part PB, but the present invention is not limited thereto. Please refer to FIGS. 3 and 4. FIG. 3 schematically illustrates a top view of the transparent traces TT1 connected to the electrode strip sets ELM of the upper part PT according to the first embodiment of the present invention, and FIG. 4 schematically illustrates a top view of the transparent traces TT1 connected to the electrode strip sets ELM of the lower part PB according to the first embodiment of the present invention. As shown in FIGS. 3 and 4, for example, the electrode strip sets ELM may include a first electrode strip set ELM1, a second electrode strip set ELM2, a third electrode strip set ELM3 and a fourth electrode strip set ELM4, the first electrode strip set ELM1 and the second electrode strip set ELM2 are disposed in the upper part PT, the first electrode strip set ELM1 is disposed between the second electrode strip set ELM2 and the pad region PR, i.e., the first electrode strip set ELM1 is closer to the pad region PR than the second electrode strip set ELM2, and the first transparent traces TT1 connected to the first electrode strip set ELM1 and the second electrode strip set ELM2 extend to the first side S1 of the light-transmitting region TR. The third electrode strip set ELM3 and the fourth electrode strip set ELM4 are disposed in the lower part PB, the third electrode strip set ELM3 is closer to the second side S2 of the light-transmitting region TR than the first side S1 of the light-transmitting region TR, the fourth electrode strip set ELM4 is disposed between the third electrode strip set ELM3 and the second side S2 of the light-transmitting region TR, and the first transparent traces TT1 connected to the third electrode strip set ELM3 and the fourth electrode strip set ELM4 extend to the second side S2 of the light-transmitting region TR.

Each first transparent trace TT1 may include a lead portion P1 disposed in the light-transmitting region TR. Each lead portion P1 extends into the opaque region OR from a region close to an end of the corresponding electrode strip set ELM, and most of the lead portions P1 extend along the second direction D2. In order to electrically connect the first transparent traces TT1 to the electrode strip sets ELM at different positions respectively, when line widths of the lead portions P1 are substantially equal to each other, lengths of the lead portions P1 need to be different from each other. As compared with metal material, the resistance of the transparent conductive material is obviously higher, and the lead portions P1 formed of the transparent conductive material easily have significantly different equivalent resistances due to different lengths. In order to homogenize the equivalent resistances of the first transparent traces TT1, each first transparent trace TT1 of this embodiment may further include a resistance adjusting portion P2, and the difference between the equivalent resistances of the lead portions P1 can be compensated by the difference between lengths of the resistance adjusting portions P2. Each resistance adjusting portion P2 of this embodiment is connected between an end of the corresponding lead portion P1 and an end of the corresponding electrode strip set ELM, but the present invention is not limited thereto.

For the first transparent traces TT1 connected to the electrode strip sets ELM of the upper part PT, since they extend to the first side S1 of the light-transmitting region TR where the pad region PR is disposed, the length of the lead portion P1 of one of the first transparent traces TT1 connected to the electrode strip set ELM closer to the pad region PR is shorter than the length of the lead portion P1 of another one of the first transparent traces TT1 connected to the electrode strip set ELM farther from the pad region PR. In order to compensate for the difference between the equivalent resistances of the plural lead portions P1 of the upper part PT, the length of the resistance adjusting portion P2 connected to the electrode strip set ELM closer to the pad region PR is longer than the length of the resistance adjusting portion P2 connected to the electrode strip set ELM farther from the pad region PR. As for the first transparent traces TT1 connected to the electrode strip sets ELM of the lower part PB, since they extend to the second side S2 of the light-transmitting region TR, the length of the lead portion P1 connected to the electrode strip set ELM closer to the second side S2 of the light-transmitting region TR is shorter than the length of the lead portion P1 connected to the electrode strip set ELM farther from the second side S2 of the light-transmitting region TR. In order to compensate for the difference between the equivalent resistances of the plural lead portions P1 of the lower part PB, the length of the resistance adjusting portion P2 connected to the electrode strip set ELM closer to the second side S2 of the light-transmitting region TR is longer than the length of the resistance adjusting portion P2 connected to the electrode strip set ELM farther from the second side S2 of the light-transmitting region TR. Therefore, the sum of the equivalent resistances of the lead portion P1 and the resistance adjusting portion P2 corresponding to each first transparent trace TT1 can approach the same, so as to reduce the difference between the equivalent resistances of the first transparent traces TT1. In other words, the equivalent resistances of the first transparent traces TT1 can be equalized, thereby reducing the phenomenon of uneven touch signals caused by different equivalent resistances of the first transparent traces TT1. For example, in the upper part PT, the length of the lead portion P1 of the first transparent trace TT1 connected to the first electrode strip set ELM1 is shorter than the length of the lead portion P1 of the first transparent trace TT1 connected to the second electrode strip set ELM2, and the length of the resistance adjusting portion P2 connected to the first electrode strip set ELM1 is longer than the resistance adjusting portion P2 connected to the second electrode strip set ELM2. In the lower part PB, the length of the lead portion P1 of the first transparent trace TT1 connected to the third electrode strip set ELM3 is longer than the length of the lead portion P1 of the first transparent trace TT1 connected to the fourth electrode strip set ELM4, and the length of the resistance adjusting portion P2 connected to the third electrode strip set ELM3 is shorter than the resistance adjusting portion P2 connected to the fourth electrode strip set ELM4.

In this embodiment, the resistance adjusting portion P2 may include a winding segment P2L, such as a serpentine line segment, and the length of the resistance adjusting portion P2 may be changed by adjusting the length of the winding segment P2L. Thus, the length of the winding segment P2L electrically connected to the electrode strip set ELM of the upper part PT may be longer as the distance between the electrode strip set ELM and the pad region PR is smaller, and the length of the winding segment P2L electrically connected to the lower PB electrode strip set ELM may be longer as the distance between the electrode strip set ELM and the pad region PR is greater. Further, each winding segment P2L may include at least one first strip line segment P21. When the winding segment P2L includes a plurality of first strip line segments P21, the first strip line segments P21 may be parallel to each other, for example, extending along the second direction D2, and the winding segment P2L may further include at least one second strip line segment P22 for connecting the first strip line segments P21. The second strip line segment P22 extends along a direction different from the second direction D2, for example, along the first direction D1. Each resistance adjusting portion P2 may further include a block-shaped portion P23 connected between an end of the winding segment P2L and an end of the corresponding electrode strip set ELM, and the winding segment P2L and the block-shaped portion P23 may constitute the resistance adjusting portion P2. Since the width of the block-shaped portion P23 in the second direction D2 is greater than the line width of the winding segment P2L, the equivalent resistance of the resistance adjusting portion P2 can be mainly determined by the equivalent resistance of the winding segment P2L. Accordingly, the difference between the equivalent resistances of the lead portions P1 can be compensated by differentiating the lengths of the winding segments P2L, so that the equivalent resistances of the first transparent traces TT1 can be uniformed.

In this embodiment, the widths of the resistance adjusting portions P2 in the first direction D1 may be the same as each other, so the width of the block-shaped portion P23 connected to the electrode strip set ELM closer to the pad region PR in the first direction D1 is smaller than the width of the block-shaped portion P23 connected to the electrode strip set ELM farther from the pad region PR in the first direction D1. Specifically, the resistance adjusting portions P2 can be formed by using block-shaped conductive materials with the same size and then forming at least one slit SL in each block-shaped conductive material through a cutting method such as laser cutting, thereby forming a winding segment P2L and a block-shaped portion P23. The lengths and the number of the first strip line segments P21 can be determined by the lengths and the number of the slits SL, so that the required lengths of the winding segments P2L can be produced. The equivalent resistance of each winding segment P2L can be adjusted through the length and width of the first strip line segment P21 and the length and width of the second strip line segment P22. For example, the first strip line segments P21 may have the same width, and the second strip line segments P22 may have the same width and the same length, so when the numbers and lengths of the first strip line segments P21 of the resistance adjusting portions P2 are designed to be different and/or the numbers of the second strip line segments P22 of the resistance adjusting portions P2 are designed to be different, the winding segments P2L can be produced to have different lengths to achieve different equivalent resistances.

In this embodiment, for the upper part PT, the line width of the lead portion P1 connected to the electrode strip set ELM (e.g., the first electrode strip set ELM1) closer to the pad region PR is smaller than the line width of the lead portion P1 connected to the electrode strip set ELM (e.g., the second electrode strip set ELM2) farther from the pad region PR, so as to equalize the equivalent resistances of the transparent traces through the difference between the line widths of the lead portions P1 in combination with the difference between the lengths of the resistance adjusting portions P2. Similarly, for the lower part PB, the line width of the lead portion P1 connected to the electrode strip set ELM (e.g., the fourth electrode strip set ELM4) closer to the second side S2 of the light-transmitting region TR may be smaller than the line width of the lead portion P1 connected to the electrode strip set ELM (e.g., the third electrode strip set ELM3) farther from the second side S2 of the light-transmitting region TR, but the present invention is not limited thereto. In another embodiment, the line widths of some or all of the lead portions P1 may be the same as each other.

In this embodiment, the resistance adjusting portion P2 of the first transparent trace TT1 connected to the electrode strip set ELM located in the center of the light-transmitting region TR has no winding segment, and the length of the lead portion P1 of this first transparent trace TT1 is longer than the lengths of the lead portions P1 of other first transparent traces TT1. Since the first transparent traces TT1 of the electrode strip sets ELM connected to the upper part PT and the lower part PB can extend to the first side S1 and the second side S2 of the light-transmitting region TR respectively, the equivalent resistance of the lead portion P1 of the first transparent trace TT1 connected to the electrode strip set ELM located in the center of the light-transmitting region TR will be greater than the equivalent resistances of the lead portions P1 of the other first transparent traces TT1. Under the condition of equalizing the equivalent resistances of the first transparent traces TT1, the equivalent resistances of the transparent traces TT1 can be effectively reduced through the design that the first transparent trace TT1 connected to the electrode strip set ELM located in the center of the light-transmitting region TR does not have winding segments. For example, the electrode strip set ELM may further include at least one sixth electrode strip set ELM6, and the first electrode strip set ELM1 and the second electrode strip set ELM2 are located between the sixth electrode strip set ELM6 and the pad region PR. In this embodiment, the sixth electrode strip set ELM6 may be the electrode strip set ELM located in the center of the light-transmitting region TR. For example, the electrode strip sets ELM may include two sixth electrode strip sets ELM6, and the sixth electrode strip sets ELM6 are the two electrode strip sets ELM in the upper part PT closest to the lower part PB, but not limited thereto. One of the first transparent traces TT1 connected to each sixth electrode strip set ELM6 may include a lead portion P1 and a block-shaped portion P23, and an end of the lead portion P1 is directly connected to and in contact with the block-shaped portion P23. The width of the block-shaped portion P23 in the first direction D1 may be the same as the widths of the resistance adjusting portions P2 of the other first transparent traces TT1 in the first direction D1. In another embodiment, the resistance adjusting portion P2 of the first transparent trace TT1 connected to one of the sixth electrode strip sets ELM6 may also have the winding segment P2L.

In this embodiment, as shown in FIG. 2, the first transparent traces TT1 can be grouped into first transparent traces TT1a and first transparent traces TT1b, and the first transparent traces TT1a and the first transparent traces TT1b are respectively located on two opposite sides (left and right sides) of the electrode strip sets ELM. In this embodiment, each electrode strip set ELM connected to the corresponding first transparent trace TT1a and each electrode strip set ELM connected to the corresponding first transparent trace TT1b are alternately arranged in sequence along the second direction D2, i.e., adjacent two of the electrode strip sets ELM are respectively connected to the first transparent trace TT1a and the first transparent trace TT1b located on two sides of the electrode strip sets ELM, so that the first transparent trace TT1 can be evenly disposed on the two sides of the electrode strip sets ELM to avoid visual asymmetry caused by inconsistent border widths on the two sides of the touch panel TP1. For example, the electrode strip sets ELM further includes a fifth electrode strip set ELM5 adjacent to the first electrode strip set ELM1, and the electrode strip sets ELM are disposed between the first transparent trace TT1a connected to the first electrode strip set ELM1 and the first transparent trace TT1b connected to the fifth electrode strip set ELM5.

Please refer to FIG. 2 again. The touch panel TP1 of this embodiment may further include at least one opaque trace OT1 and at least one opaque trace OT2, which are disposed in the opaque region OR for electrically connecting the first transparent traces TT1 extending to the second side S2 of the light-transmitting region TR to the pads BP in the pad region PR. The first transparent traces TT1a are disposed between the opaque trace OT1 and the electrode strip sets ELM, and the opaque trace OT1 extends from the second side S2 of the light-transmitting region TR to the pad region PR of the first side S1 through the third side S3, while the first transparent traces TT1b are disposed between the opaque trace OT2 and the electrode strip sets ELM, and the opaque trace OT2 extends from the second side S2 of the light-transmitting region TR to the pad region PR of the first side S1 through the fourth side S4. The number of first transparent traces TT1a connected to the electrode strip sets ELM of the lower part PB is the same as the number of opaque traces OT1, and the number of first transparent traces TT1b connected to the electrode strip sets ELM of the lower part PB is the same as the number of opaque traces OT2. Thus, the electrode strip sets ELM in the lower part PB can be electrically connected to the pads BP in the pad region PR through the opaque traces OT1 and the opaque traces OT2, respectively. It should be noted that the opaque traces OT1 and the opaque traces OT2 may be formed of an opaque conductive layer, which may include, for example, a metal material, such as silver, so that the resistivity of the opaque trace OT1 and the opaque trace OT2 may be much smaller than the resistivity of the transparent conductive material forming the first transparent traces TT1 and the electrode strip sets ELM, so that the equivalent resistances of the opaque trace OT1 and the opaque trace OT2 may be neglected relative to the equivalent resistances of the first transparent traces TT1. Therefore, in this embodiment, the first transparent traces TT1 connected to the electrode strip sets ELM of the lower part PB can be designed to extend to the second side S2 of the light-transmitting region TR, thereby reducing the equivalent resistances of the first transparent traces TT1.

The touch panel TP1 of this embodiment may further include a plurality of opaque traces OT3 disposed in the opaque region OR on the first side S1 of the light-transmitting region TR for being respectively connected to the first transparent traces TT1 extending to the first side S1 of the transparent portion TR, thereby electrically connecting the electrode strip sets ELM of the upper part PT to the pads BP. In addition, the touch panel TP1 of this embodiment may optionally further include at least one grounding trace GT surrounding the light-transmitting region TR to avoid electrostatic damage to the internal circuit of the touch panel TP1.

Figure 5:
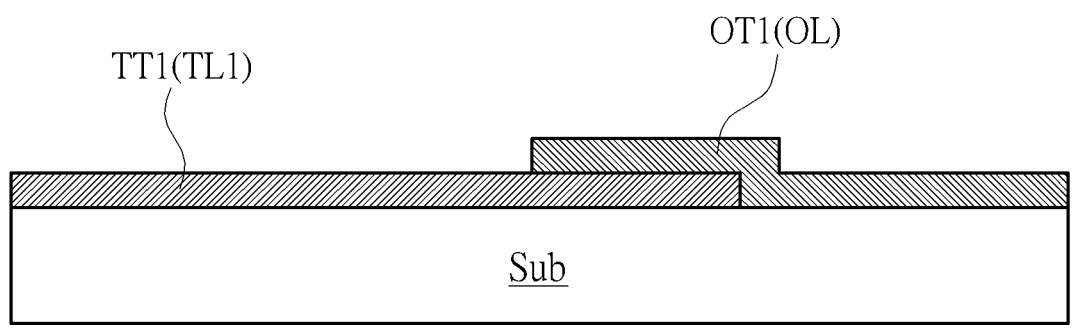
FIG. 5 schematically illustrates a sectional view along a sectional line A-A' of FIG. 4.

Please refer to FIG. 5, which schematically illustrates a sectional view along a sectional line A-A' of FIG. 4. As shown in FIG. 5, the first transparent traces TT1 of this embodiment is formed of the first transparent conductive layer TL1, the opaque traces OT1 are formed of the opaque conductive layer OL, and a portion of the opaque conductive layer OL can be directly formed on the first transparent conductive layer TL1, so that each opaque trace OT1 can be directly electrically connected to the corresponding first transparent trace TT1, but not limited thereto. For example, when the number of the opaque traces OT1 is plural and is made of silver, the opaque traces OT1 can be formed by forming a single opaque trace with a wider width and then cutting the this wider opaque trace into a plurality of opaque traces OT1 by laser cutting. Similarly, the opaque traces OT2 can be formed in the same manner. In another embodiment, the opaque conductive layer OL may be formed before forming the first transparent conductive layer TL1 and be disposed between a part of the first transparent conductive layer TL1 and the substrate Sub.

Figure 6:
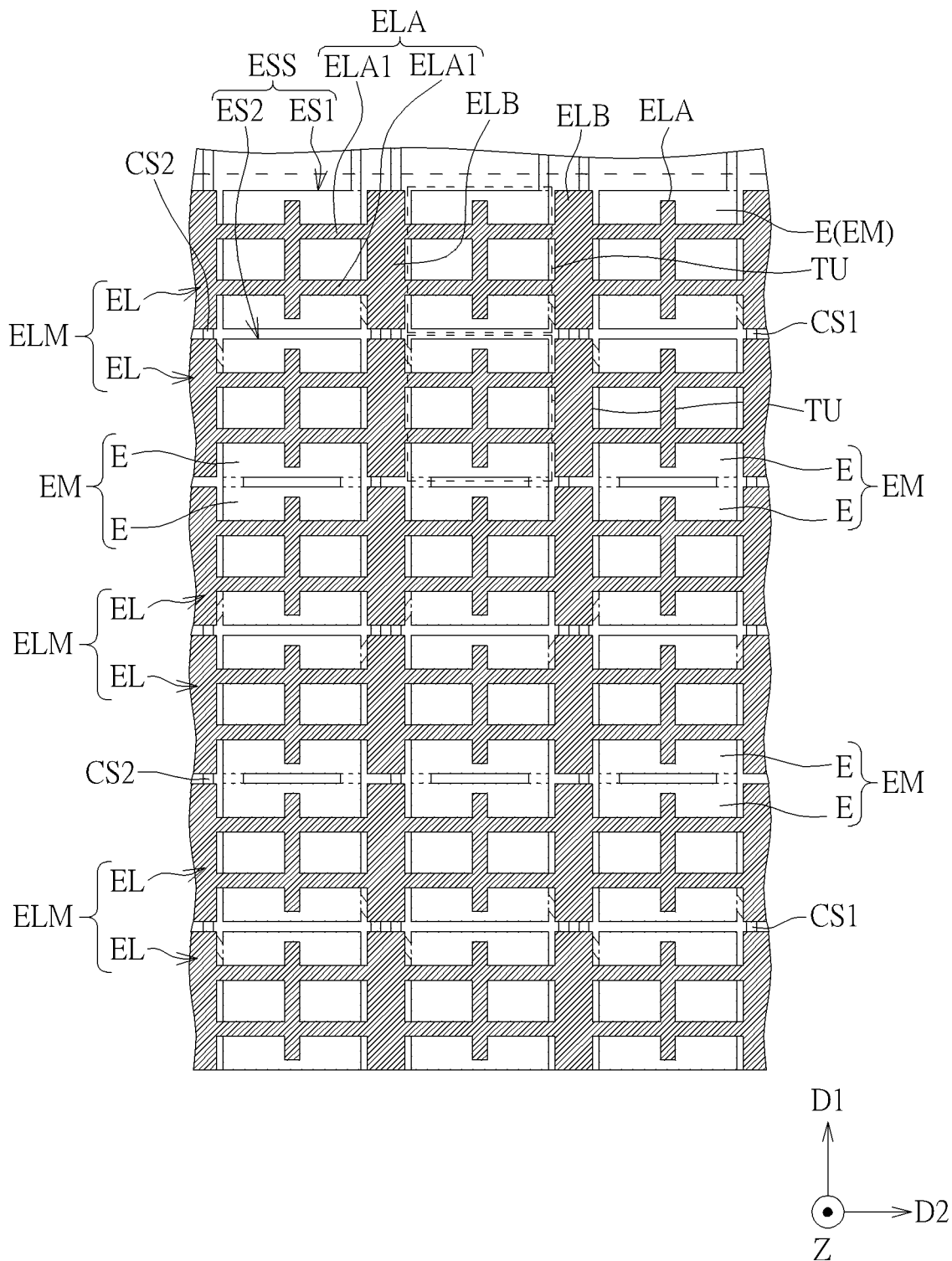
FIG. 6 schematically illustrates a top view of the electrode strip sets and the electrode series sets according to the first embodiment of the present invention.
Figure 7:
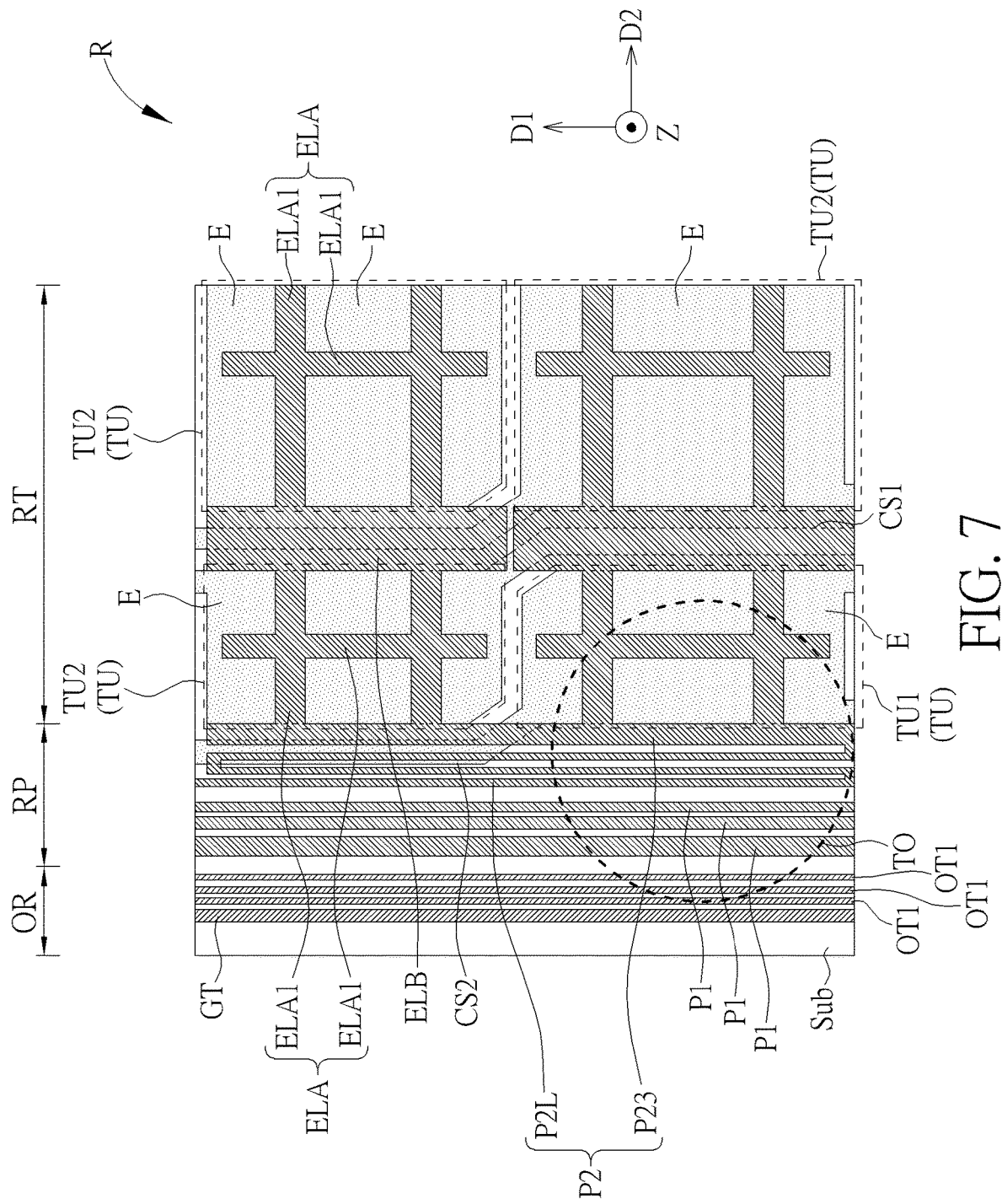
FIG. 7 schematically illustrates an enlarged view of the touch panel corresponding to a region R of FIG. 2 crossing the touch region, the peripheral region and the opaque region according to the first embodiment of the present invention.

Please refer to FIG. 6 and FIG. 7 together with FIG. 2. FIG. 6 schematically illustrates a top view of the electrode strip sets and the electrode series sets according to the first embodiment of the present invention, and FIG. 7 schematically illustrates an enlarged view of the touch panel corresponding to a region R of FIG. 2 crossing the touch region RT, the peripheral region RP and the opaque region OR according to the first embodiment of the present invention. As shown in FIG. 2, FIG. 6 and FIG. 7, each electrode strip set ELM of this embodiment includes two electrode strips EL separated from each other, and the electrode strips EL of each electrode strip set ELM can be electrically connected to each other through corresponding transparent traces, for example, through the block-shaped portion P23 of the corresponding first transparent trace TT1. Each electrode series set ESS may include a first electrode series ES1 and a second electrode series ES2. Each of the first electrode series ES1 and the second electrode series ES2 includes a plurality of electrode groups EM electrically connected to each other, in which the electrode groups EM are arranged in an array, the electrode groups EM of each electrode series set ESS are arranged in the same column, the electrode groups EM of each first electrode series ES1 are located in odd rows, and the electrode groups EM of each second electrode series ES2 are located in even rows. Moreover, each first electrode series ES1 includes a plurality of first connecting segments CS1, and each first connecting segment CS1 connects two adjacent electrode groups EM of the corresponding first electrode series ES1. Each second electrode series ES2 includes a plurality of second connecting segments CS2, and each second connecting segment CS2 connects two adjacent electrode groups EM of the corresponding second electrode series ES2. In this embodiment, the first connecting segments CS1 and the second connecting segments CS2 are located on the right and left sides of the corresponding electrode groups EM, respectively, but the present invention is not limited thereto, and vice versa. The row direction and the column direction of the array may be, for example, the first direction D1 and the second direction D2, respectively, but not limited thereto. Each electrode strip set ELM overlaps the electrode groups EM of two adjacent rows in the top view direction Z, and two adjacent electrode strip sets ELM overlap the electrode groups EM of the same row in the top view direction Z. Specifically, the electrode group EM in the first row of each column and the electrode group EM in the last row of each column respectively include an electrode E, and the remaining electrode groups EM include at least two electrodes E arranged along the second direction D2, so that the electrodes E can also be arranged in an array formation. The electrodes E of each electrode group EM are separated from each other but electrically connected to each other. Each electrode strip EL overlap the electrodes E of the same row in the electrode groups EM of the same row in the top view direction Z, so that each electrode strip EL and the corresponding overlapped electrode E are capacitively coupled to each other to form a touch unit TU. Therefore, the touch region RT of the touch panel TP1 may be an area formed by the touch units TU, while the peripheral region RP is an area outside the touch units TU. In this embodiment, each electrode strip EL may include a plurality of electrode portions ELA overlapping a corresponding one of the electrodes E, and the boundary between the touch region RT and the peripheral region RP may be defined through the boundary where the electrode portion ELA contacts the first transparent trace TT1. For example, the electrode portions ELA may be formed by connecting a plurality of strip portions ELA1, for example, forming a grating shape. Each electrode strip EL of this embodiment may optionally further include a plurality of shielding portions ELB, and each electrode portion ELA and each shielding portion ELB are alternately connected in series along the first direction D1, but not limited thereto. In each electrode strip EL of this embodiment, the width of the touch unit TU closest to the peripheral region RP (nearest to the first transparent trace TT1) in the first direction D1 may be smaller than the width of the touch unit TU not closest to the peripheral region RP in the first direction D1. In such situation, in order to uniform the amounts of sensing signals sensed by the touch units TU, the width of the strip portion ELA1 of the electrode portion ELA closest to the peripheral region RP may be greater than the width of the strip portion ELA1 of the electrode portion ELA not closest to the peripheral region RP. In another embodiment, each electrode strip set ELM may be a single electrode strip overlapping the electrode groups EM of two adjacent rows. In further another embodiment, each electrode strip set ELM may be composed of only one first electrode strip, each electrode series set ESS may be composed of only one second electrode strip, and each first electrode strip and each second electrode strip may be coupled to each other to form a touch unit. The design of the touch units formed by the electrode strip sets and the electrode series sets of the present invention is not limited to the mentioned above, but may also be other types of touch panels.

In addition, one of the resistance adjusting portions P2 of this embodiment may overlap one of the first connecting segments CS1 and one of the second connecting segments CS2. Specifically, the resistance adjusting portion P2 of the first transparent trace TT1$a$ may overlap the second connecting segment CS2 of the electrode series set ESS closest to the first transparent trace TT1$a$, and the resistance adjusting portion P2 of the first transparent trace TT1$b$ may overlap the first connecting segment CS1 of the electrode series set ESS closest to the first transparent trace TT1$b$. It is noted that the resistance adjusting portion P2 of this embodiment is made of the original shielding portion closest to the corresponding first transparent trace TT1, so the width of the resistance adjusting portion P2 in the first direction D1 can be the same as the width of the shielding portion ELB in the first direction D1. The advantage of this design is that the shielding portion ELB can achieve the purpose of uniforming the equivalent resistances of the first transparent traces TT1 almost without damaging the shielding effect.

Figure 8:
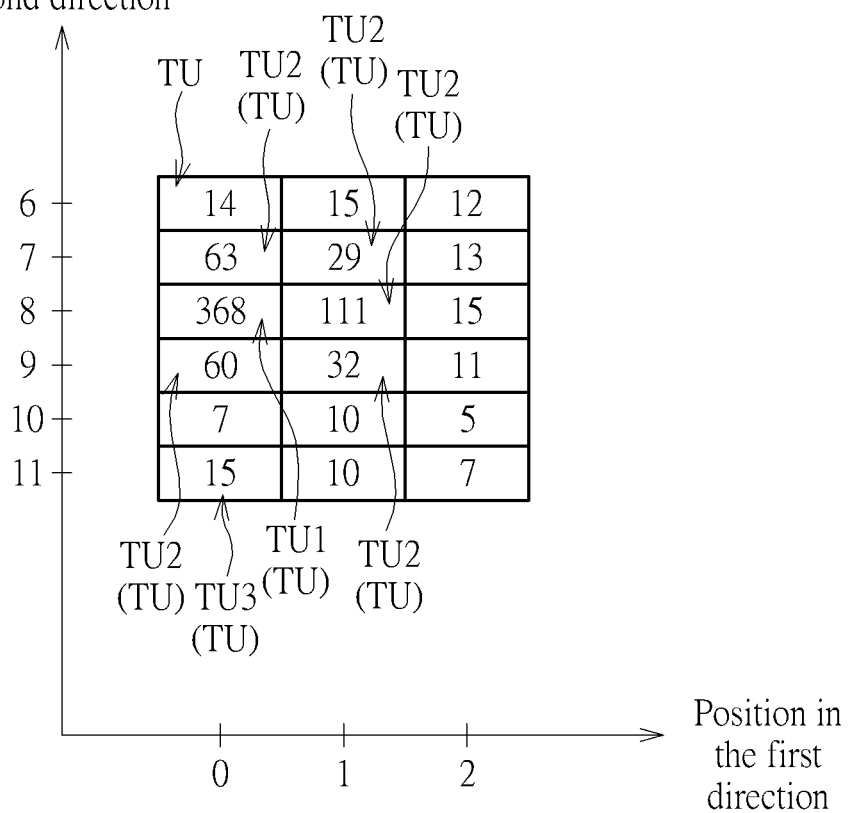
FIG. 8 schematically illustrates positions and corresponding amounts of sensing signals sensed by the touch units when the touch position of the user is located on the first transparent trace.

The following description further explains that the design of the resistance adjusting portion P2 of this embodiment does not affect the sensing position in the second direction D2 detected by the touch units TU of a column closest to the peripheral region RP. Please refer to FIG. 8, which schematically illustrates positions and corresponding amounts of sensing signals sensed by the touch units when the touch position of the user is located on the first transparent trace, in which the amounts of sensing signals shown in FIG. 8 is only for an example, and the present invention is not limited thereto. As shown in FIGS. 6 to 8, the touch unit TU1 is one of the touch units TU adjacent to the peripheral region RP, the touch units TU2 are the touch units TU surrounding the touch unit TU1, the electrode E used for forming the touch unit TU3 is electrically connected to the electrode E used for forming the touch unit TU1, and the first transparent trace TT1 electrically connected to the touch unit TU1 overlaps the touch object TO when the user touches the touch panel TP1. When the center point of the touch object TO of the user touching the touch panel TP1 is substantially located on the boundary between the touch unit TU1 and the peripheral region RP, the amount of sensing signal sensed by the touch unit TU1 can reach, for example, 368 signal amounts, and the amount of sensing signal sensed by the touch unit TU3 far from the touch unit TU1 can reach, for example, 15 signal amounts due to capacitive coupling of the touch object TO with the first transparent trace TT1 corresponding to the touch unit TU3 and the electrode E of the touch unit TU1 electrically connected to the electrode E of the touch unit TU3. The touch panel TP1 serves the touch unit TU1 with the largest amount of sensing signal as a center point of a 3 by 3 grid to obtain the amounts of sensing signals sensed by the touch units TU in the 3 by 3 grid, the amounts of sensing signals are used as the basis for calculating the touch position, and the amounts of sensing signals sensed by the touch units TU outside the 3 by 3 grid are not taken into account. In this example, the touch panel TP1 calculates the touch position based on the amounts of sensing signals sensed by the touch unit TU1 and the touch unit TU2, and the touch unit TU3 located outside the 3 by 3 grid is not considered in the calculation. Therefore, although the touch unit TU3 has a certain amount of sensing signal, the position of the touch unit TU3 is not located in the 3 by 3 grid, so that the amount of sensing signal generated by the touch unit TU3 doesn't affect the accuracy of the detected position of the touch panel TP1 in the second direction D2 when detecting the touch object TO. For this reason, if the touch object TO moves linearly along the second direction D2, the amount of sensing signal of the touch unit TU3 also doesn't affect the measured linear accuracy. In this embodiment, since the width of the peripheral region RP in the first direction D1 is less than half of the touch object TO, when the center point of the touch object TO is substantially located on the boundary between the touch unit TU1 and the peripheral region RP, a part of the touch object TO may overlap the opaque region OR. For example, the width of the peripheral region RP may be about 1.9 millimeters.

It should be noted that through the design of touch panel TP1 mentioned above, the number of the opaque traces OT1 and the opaque traces OT2 in this embodiment can be reduced. As shown in FIG. 1, since the opaque traces OT1 and the opaque traces OT2 are included in the touch layer TL, the overlapping area between the touch layer TL and the opaque region OR can be reduced, so that when the display device DD is adhered to the touch panel TP, the display device DD can be directly adhered to the Substrate Sub instead of being indirectly adhered to the substrate sub through the touch layer TL. In this way, when the display device DD needs to be separated from the substrate Sub, the touch layer TL will not be attached to the display device DD due to strong adhesion with the display device DD, and the touch layer TL is easier to be separated from the display device DD.

Figure 9:
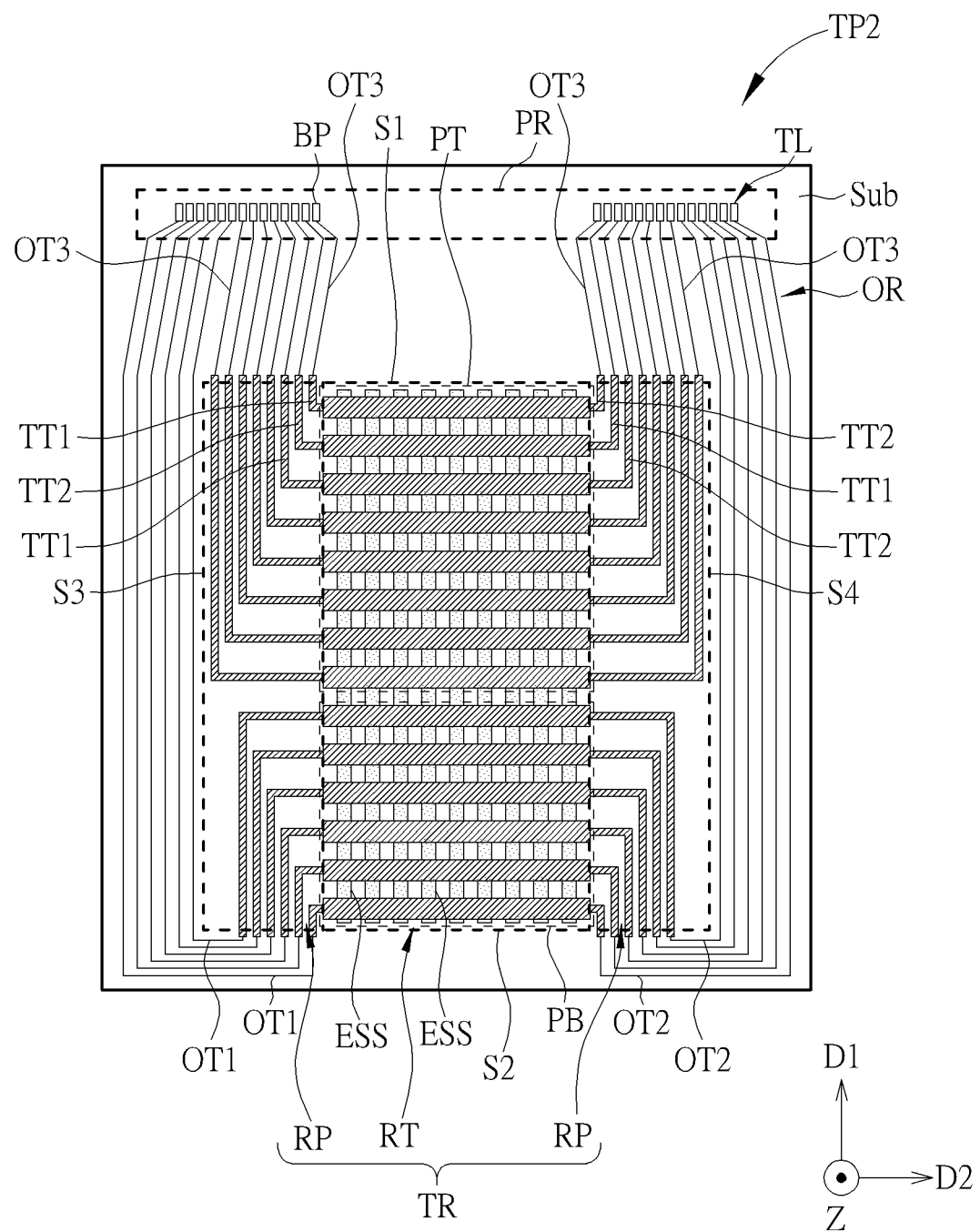
FIG. 9 schematically illustrates a top view of a touch panel according to a second embodiment of the present invention.

Please refer to FIG. 9, which schematically illustrates a top view of a touch panel according to a second embodiment of the present invention. As shown in FIG. 9, the touch panel TP2 of this embodiment is different from the first embodiment in that the touch panel TP2 of this embodiment may further include a plurality of second transparent traces TT2, and each of which is connected to the other end of one of the electrode strip sets ELM, so that both ends of the same electrode strip set ELM may be respectively connected to the first transparent trace TT1 and the second transparent trace TT2, and the same electrode strip set ELM may be connected to the same signal end through two transparent traces. Hence, when the driving signal is provided, the driving signal can be simultaneously transmitted to the first transparent trace TT1 and the second transparent trace TT2. As compared with the first embodiment, the equivalent resistance between each electrode strip set ELM and the corresponding pad BP of this embodiment can be reduced, or the widths of the first transparent traces TT1 and the widths of the second transparent traces TT2 can be smaller than the widths of the first transparent traces of the first embodiment when the equivalent resistance between each electrode strip set ELM and the pad BP of this embodiment is the same as that of the first embodiment. In this embodiment, the structure of the second transparent trace TT2 may be symmetrical to the structure of the corresponding first transparent trace TT1, so in the upper part PT, the length of the lead portion P1 of the second transparent trace TT2 connected to the first electrode strip set ELM1 is shorter than the length of the lead portion P1 of the second transparent trace TT2 connected to the second electrode strip set ELM2, and the length of the resistance adjusting portion P2 of the second transparent trace TT2 connected to the first electrode strip set ELM1 is longer than the resistance adjusting portion P2 of the second transparent trace TT2 connected to the second electrode strip set ELM2 In the lower part PB, the length of the lead portion P1 of the second transparent trace TT2 connected to the third electrode strip set ELM3 is longer than the length of the lead portion P1 of the second transparent trace TT2 connected to the fourth electrode strip set ELM4, and the length of the resistance adjusting portion P2 of the second transparent trace TT2 connected to the third electrode strip set ELM3 is shorter than the resistance adjusting portion P2 of the second transparent trace TT2 connected to the fourth electrode strip set ELM4. In this embodiment, the second transparent traces TT2 connected to the electrode strip sets ELM of the lower part PB can also be electrically connected to the pads BP through the opaque trace OT1 and the opaque trace OT2, so the sum of the numbers of the first transparent traces TT1 and the second transparent traces TT2 connected to the electrode strip sets ELM of the lower part PB is the same as the sum of the numbers of the opaque traces OT1 and the opaque traces OT2.

Figure 10:
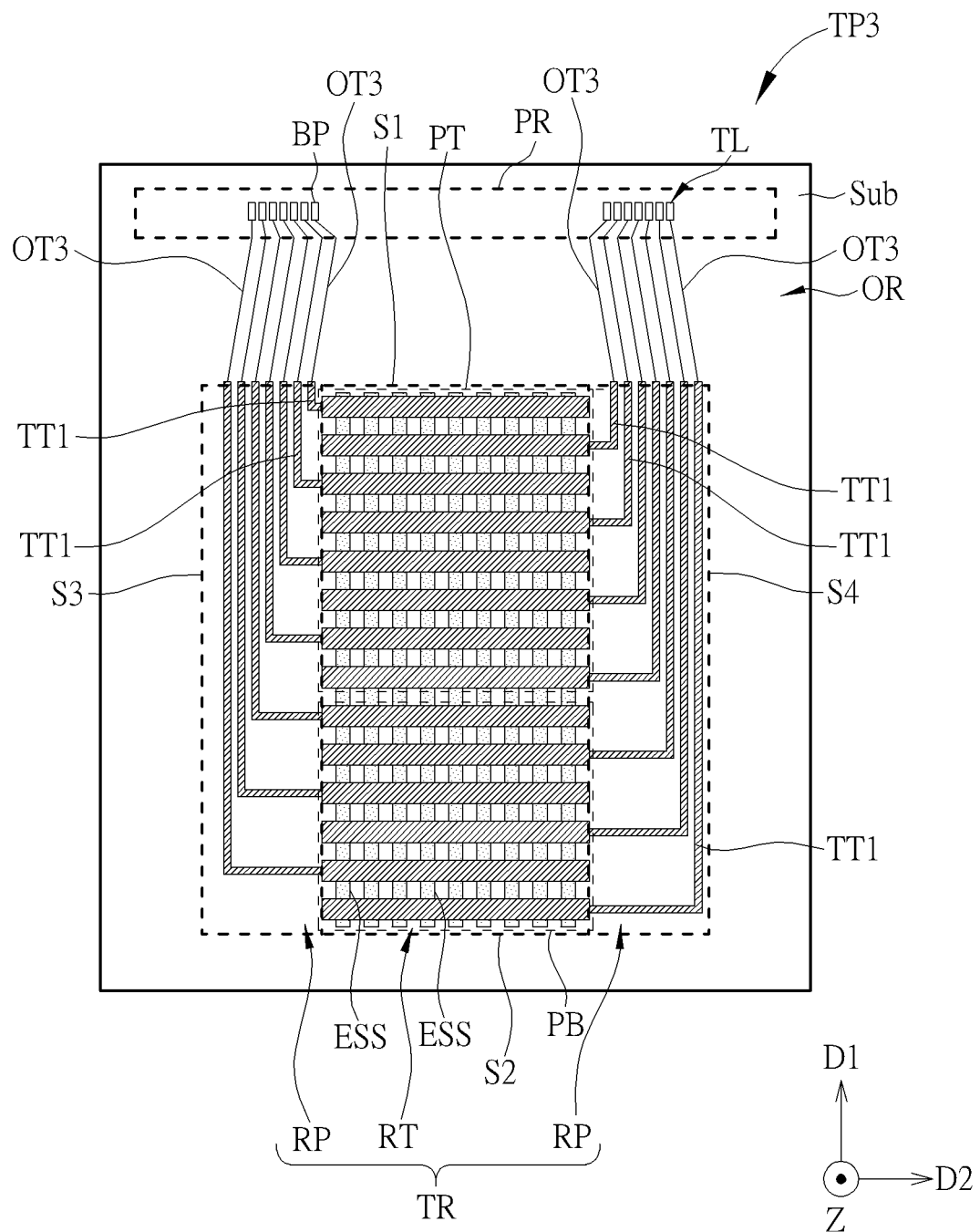
FIG. 10 schematically illustrates a top view of a touch panel according to a third embodiment of the present invention.

Please refer to FIG. 10, which schematically illustrates a top view of a touch panel according to a third embodiment of the present invention. As shown in FIG. 10, the touch panel TP3 of this embodiment is different from the first embodiment in that the touch panel TP3 of this embodiment does not include opaque traces. In other words, the electrode strip sets ELM of this embodiment are not grouped into the upper part and the lower part, and each of all the first transparent traces TT1 respectively extend from an end of the electrode strip set ELM to the first side S1 of the light-transmitting region TR, so there is no need for opaque traces. Accordingly, the border width of the touch panel TP3 of this embodiment can be more effectively lowered to achieve a situation close to borderless.

Figure 11:
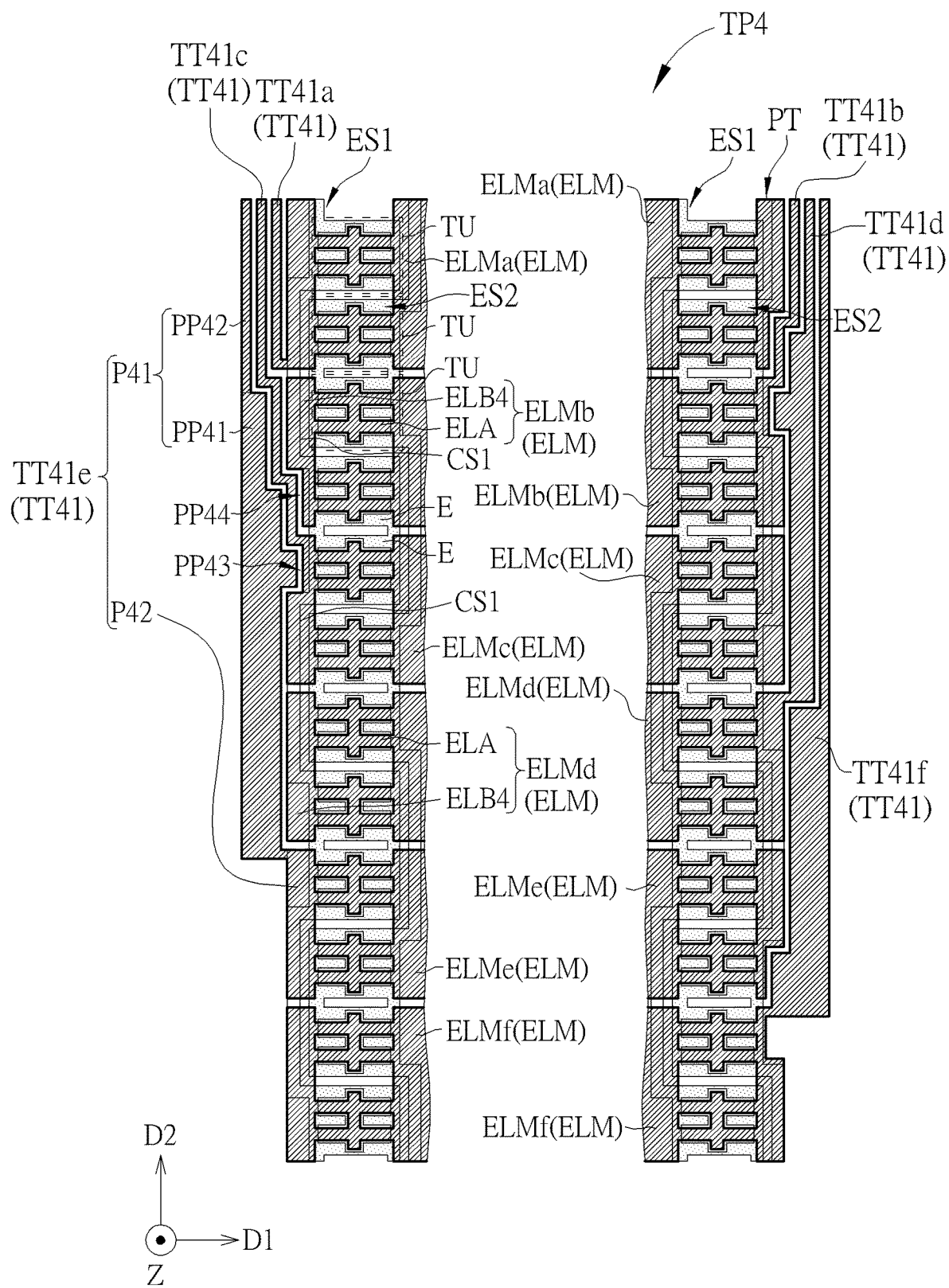
FIG. 11 schematically illustrates a partial top view of a touch panel according to a fourth embodiment of the present invention.

Please refer to FIG. 11, which schematically illustrates a partial top view of a touch panel according to a fourth embodiment of the present invention. In order to clearly show each first transparent trace TT41, FIG. 11 only illustrates the structures of the first transparent traces TT41 connected to the electrode strip sets ELM of the upper part PT and the touch units TU of two columns closest to these first transparent traces TT41, but the present invention is not limited thereto. As shown in FIG. 11, the touch panel TP4 of this embodiment is different from the above embodiment in that the lead portion P41 of the first transparent trace TT41 of this embodiment has a non-uniform width, so that the line width of the lead portion P41 can be widened by using a region where the first transparent conductive layer is not disposed, thereby reducing the equivalent resistance of the lead portion P41 and compensating for the difference between the equivalent resistances of the first transparent traces TT41. In other words, each lead portion P41 may have a part extending into the opaque region OR along the second direction D2, and the part of one of the lead portions P41 includes a first part PP41 and a second part PP42, and the width of the first part PP41 in the first direction D1 is different from the width of the second part PP42 in the first direction D1. In this embodiment, the first transparent traces TT41 connected to the electrode strip sets ELM are alternately arranged on two sides of the electrode strip sets ELM along the second direction D2, so that the first transparent traces TT41 respectively connected to two adjacent electrode strip sets ELM are respectively positioned on the two opposite sides of the electrode strip sets ELM. For example, the electrode strip sets ELMa, ELMb, ELMc, ELMd, ELMe, ELMf of the upper part PT are sequentially arranged in the second direction D2, in which the first transparent traces TT41a, TT41c, TT41e respectively connected to the electrode strip sets ELMa, ELMc, ELMe are adjacent to the third side S3 of the light-transmitting region TR (located on the same side of the electrode strip sets ELM). Since the electrode strip set ELMe is farther from the first side S1 of the light-transmitting region TR than the electrode strip set ELMc, the length of the first transparent trace TT41e is greater than the length of the first transparent trace TT41c. The resistance adjusting portion P42 of the first transparent trace TT41c of this embodiment may have a concavity PP43 in the situation that the first transparent traces TT41 cover most of the first connecting segments CS1, i.e., the concavity PP43 may be located between two adjacent first connecting segments CS1, so that the width of the first part PP41 of the first transparent trace TT41e corresponding to the concavity PP43 in the first direction D1 may be greater than the width of the second part PP42 not corresponding to the concavity PP43 in the first direction D1. The shielding portion ELB4 of the electrode strip set ELMb closest to the third side S3 may also have another concavity PP44 located between two adjacent first connecting segments CS1, so that the first part PP41 of the first transparent trace TT41c may also be disposed in the concavity PP44, thereby widening the width of the first part PP41 of the first transparent trace TT41e corresponding to the concavity PP44. In addition, since there are no other first transparent traces TT41 between the first part PP41 and the shielding portion ELB4 of the electrode strip set ELMd and between the first part PP41 and the resistance adjusting portion P42 of the first transparent trace TT41c, the width of the first part PP41 corresponding to the shielding portion ELB4 of the electrode strip set ELMd and the resistance adjusting portion P42 of the first transparent trace TT41c can also be widened. The design of the first transparent trace TT41e can effectively reduce the equivalent resistance of the first transparent trace TT41e. It is noted that under the condition of uniforming the equivalent resistances of the first transparent traces TT41, the equivalent resistance of the longest first transparent trace TT41 (e.g., the first transparent trace TT41e) determines the equivalent resistance of each first transparent trace TT41, so when the equivalent resistance of the longest first transparent trace TT41 is reduced, the equivalent resistances of the remaining first transparent traces TT41 may also be reduced. In some embodiments, other first transparent traces TT41 adjacent to the third side S3 of the light-transmitting region TR may also have first parts PP41 and second parts PP42 with different widths. Similarly, the equivalent resistances of the first transparent traces TT41b, TT41d, TT41f respectively connected to the electrode strip sets ELMb, ELMd, ELMf can also be reduced through the design of the same concept. In this way, the amount of the sensing signal obtained by the touch panel TP4 through each first transparent trace TT41 can be effectively increased, thereby improving the touch accuracy. For example, the equivalent resistance of each first transparent trace TT41 may be reduced to 15 kiloohms (kohm), in which the obtained amount of sensing signal of this case may be 30% higher than the case of the equivalent resistance of each first transparent trace of 28.7 kohm. In some embodiments, the positions and lengths of the first part PP41 and the second part PP42 of the first transparent traces TT41 can be adjusted according to the design of the electrode series.

In the first transparent traces TT41 of this embodiment, the resistance adjusting portion P42 may not have a winding segment, and the line width of the longer lead portion P41 may be widened to achieve uniform equivalent resistances of the first transparent traces TT41, but the present invention is not limited thereto. In addition, in some embodiments, as compared with the first embodiment shown in FIG. 6, the width of the shielding portion ELB4 of each electrode strip set ELM in the second direction D2 may be slightly greater than or substantially equal to the total width of two adjacent electrodes E in the second direction D2, that is, the shielding portion ELB4 may be formed by connecting two adjacent shielding portions of the first embodiment to each other, thereby shielding a larger part of the connecting segments.

Figure 12:
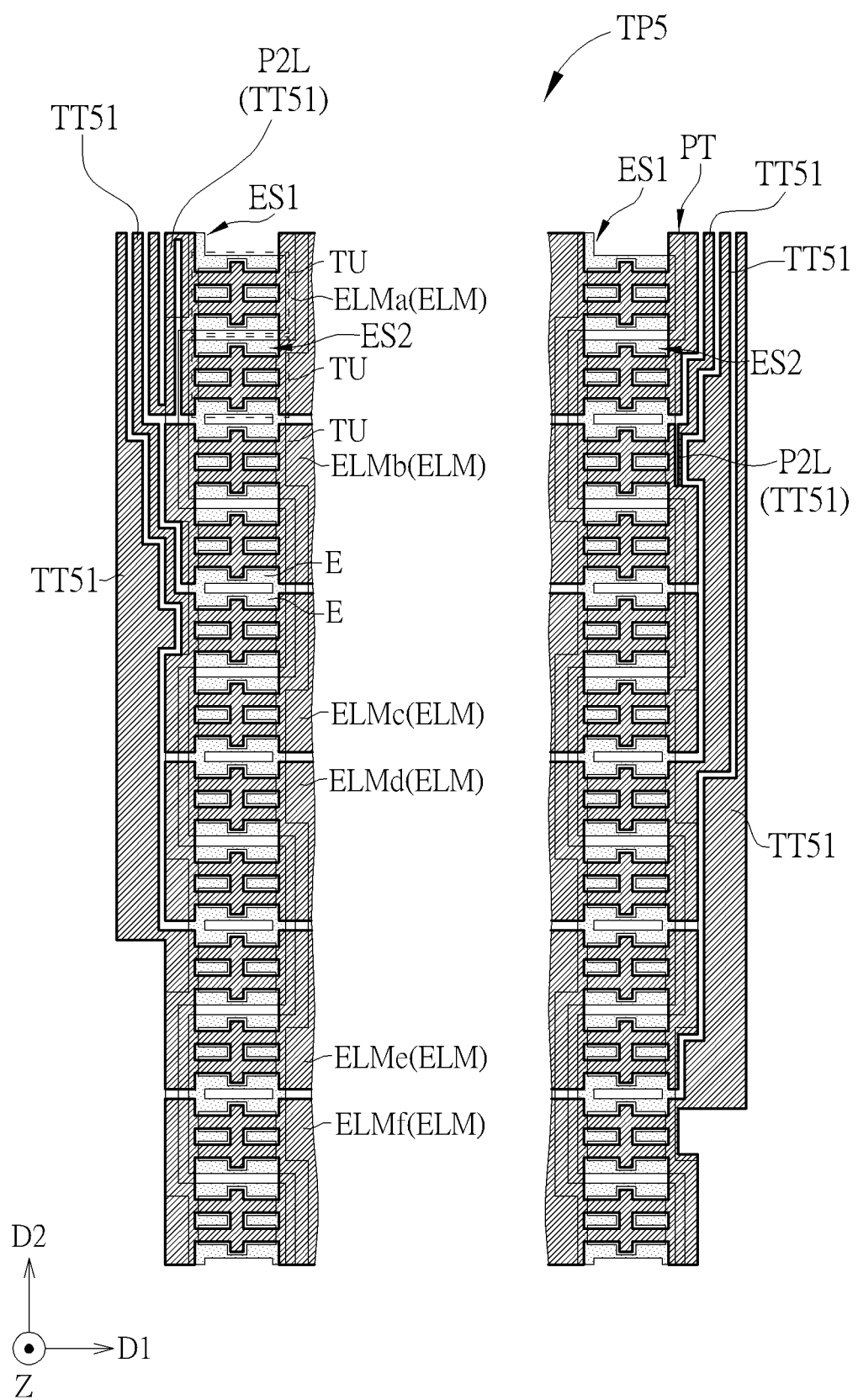
FIG. 12 schematically illustrates a partial top view of a touch panel according to a fifth embodiment of the present invention.

Please refer to FIG. 12, which schematically illustrates a partial top view of a touch panel according to a fifth embodiment of the present invention. As shown in FIG. 12, the touch panel TP5 of this embodiment is different from the fourth embodiment shown in FIG. 11 in that at least one first transparent trace TT51 of this embodiment may also include a winding segment P2L, for example, the first transparent trace TT51 connected to the electrode strip set ELM closest to the first side S1 may include a winding segment P2L. That is to say, the equivalent resistances of the first transparent traces TT51 may be uniformed and raised by both the designs of the winding segment P2L and the uneven line width of the first transparent trace TT51. The number of first transparent traces TT51 having the winding segments P2L can be determined according to the equivalent resistance of the first transparent trace with the longest length.

Figure 13:
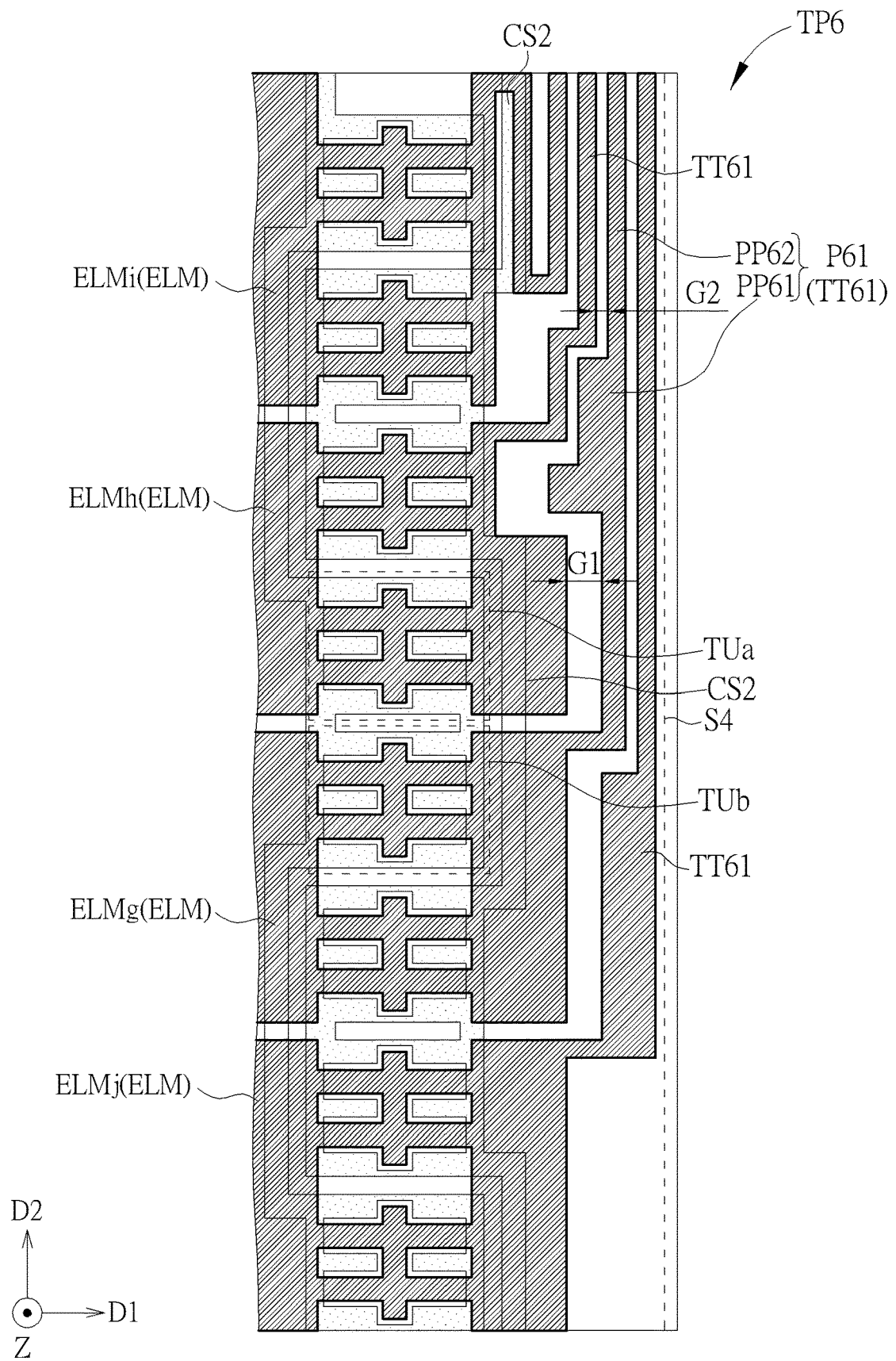
FIG. 13 schematically illustrates a top view of a touch panel according to a sixth embodiment of the present invention.

Please refer to FIG. 13, which schematically illustrates a top view of a touch panel according to a sixth embodiment of the present invention. As shown in FIG. 13, the touch panel TP6 of this embodiment is different from the fourth embodiment shown in FIG. 11 in that the first transparent traces TT61 respectively connected to two adjacent electrode strip sets ELM are located on the same side of the electrode strip sets ELM in this embodiment. Specifically, all the first transparent traces TT61 of this embodiment may be disposed on the same side of the electrode strip sets ELM (e.g., all adjacent to the fourth side S4 or the third side S3 of the light-transmitting region TR). The lead portions P61 of the first transparent traces TT61 respectively connected to the electrode strip sets ELMg, ELMh and ELM1 are taken as an example in the following description, but the present invention is not limited thereto. In the lead portion P61 electrically connected to the electrode strip set ELMg, the first part PP61 is connected between the second part PP62 and the electrode strip set ELMg, and a spacing G1 between the first part PP61 and the electrode strip set ELMh adjacent to the electrode strip set ELMg in the first direction D1 is greater than a spacing G2 between the second part PP62 and the lead portion P61 connected to the electrode strip set ELMh adjacent to the electrode strip set ELMg in the first direction D1. In this embodiment, the first part PP61 is disposed at an end of the electrode strip set ELMh adjacent to the fourth side S4, especially on one side of the touch unit TUa adjacent to the electrode strip set ELMg, and the second part PP62 is disposed at an end of the electrode strip set ELM1 adjacent to the fourth side S4, in which the electrode strip set ELMh is adjacent to the electrode strip set ELMg, and the electrode strip set ELM1 is not adjacent to the electrode strip set ELMg. Since all the first transparent traces TT61 respectively connected to the electrode strip sets ELM extend from the same side of the electrode strip sets ELM, the first part PP61 of the first transparent trace TT61 corresponding to the touch unit TUb adjacent to the touch unit TUa in the first direction D1 not only is adjacent to the touch unit TUa in the second direction, but also provides a non-negligible amount of sensing signal when the touch panel TP6 is touched. Thus, if the first part PP61 is too close to the electrode strip set ELMh adjacent to the electrode strip set ELMg, when the user touches the touch unit TUa adjacent to the electrode strip set ELMg, the amount of sensing signal coupled between the first part PP61 connected to the electrode strip set ELMg and the touch object will cause the touch panel TP6 to determine that a part of the touch object is located on the touch unit TUb, thereby affecting the touch accuracy. Hence, although this embodiment can use the space between two adjacent second connecting segments CS2 to make the width of the first part PP61 in the first direction D1 be greater than the width of the second part PP62 in the first direction D1, by means of increasing the spacing between the first part PP61 and the touch units TUa adjacent to the touch unit TUb electrically connected to the first part PP61, the touch accuracy can be effectively prevented from being affected by the widening of the line width of the lead portion P61. Similarly, the first transparent traces TT61 respectively electrically connected to the electrode strip set ELMh and the electrode strip set ELMj may have the same design.

Figure 14:
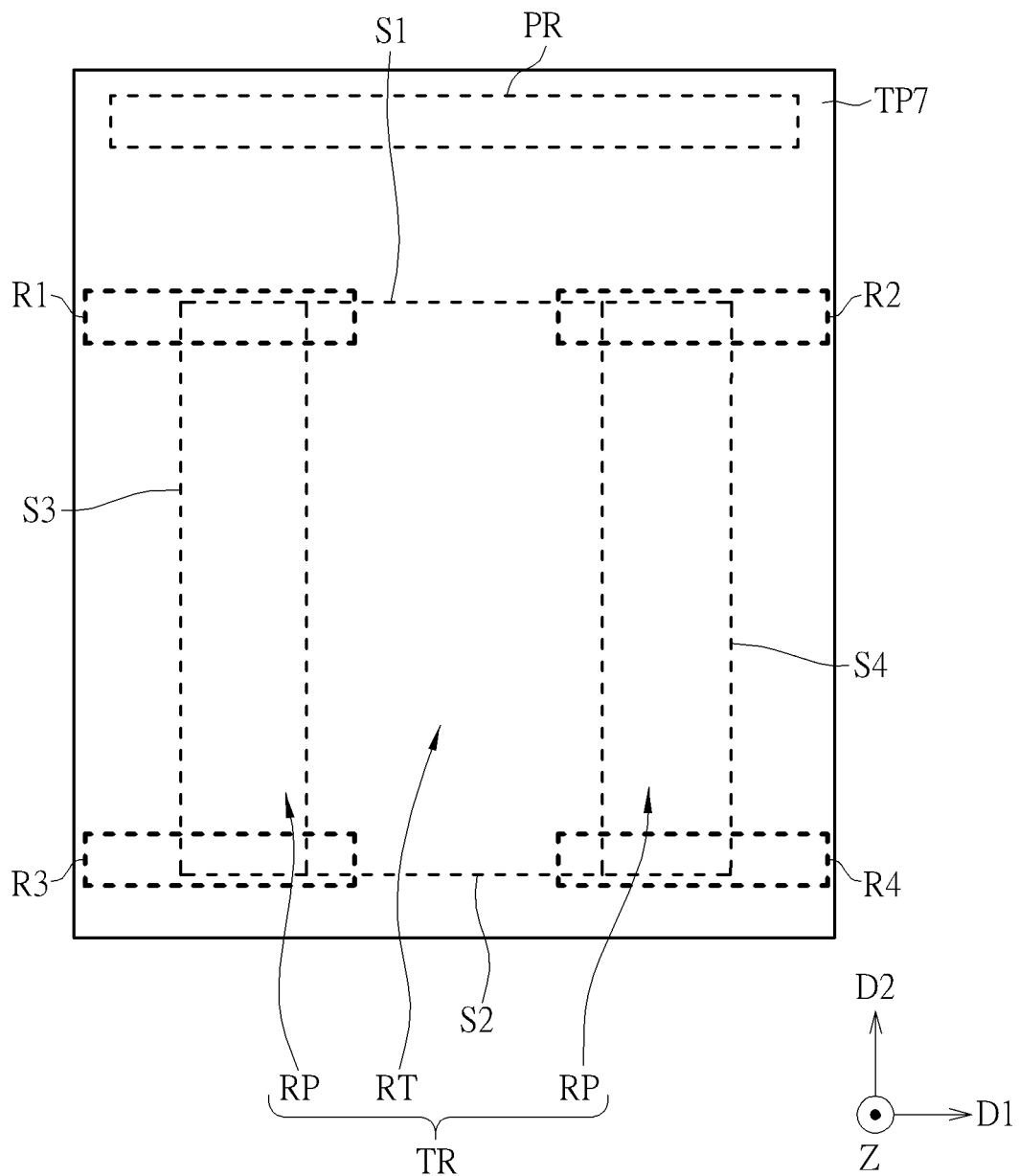
FIG. 14 schematically illustrates a top view of a touch panel according to a seventh embodiment of the present invention.

Please refer to FIG. 14 and FIGS. 15A to 15D. FIG. 14 schematically illustrates a top view of a touch panel according to a seventh embodiment of the present invention. FIGS. 15A to 15D schematically illustrate enlarged views of regions R1, R2, R3 and R4 in FIG. 14, respectively. As shown in the region R1 of FIGS. 14 and 15A, the opaque traces OT73 of the touch panel TP7 of this embodiment are disposed in the opaque region OR on the first side S1 of the light-transmitting region TR, and each opaque trace OT73 is connected to an end of the corresponding first transparent trace TT71 (e.g., the first transparent trace TT71 disposed in the peripheral region RP adjacent to the third side S3 of the light-transmitting region TR and extending from the first side S1). Each opaque trace OT73 and the corresponding first transparent trace TT71 have a first connecting region CR1, and the first connecting regions CR1 are arranged along the first direction D1. Specifically, the touch panel TP7 further includes a plurality of opaque traces OT74 disposed in the opaque region OR on the first side S1 of the light-transmitting region TR, in which each electrode series set ESS includes a first electrode series ES1 and a second electrode series ES2, and each opaque trace OT74 is electrically connected to one of the first electrode series ES1 and the second electrode series ES2. Each opaque trace OT74 and the corresponding first electrode series ES1 or the corresponding second electrode series ES2 have a second connecting region CR2, and one of the second connecting regions CR2 overlaps one of the first connecting regions CR1 in the top view direction Z. Furthermore, the opaque traces OT73 may be formed of a first opaque conductive layer OL1, the opaque traces OT74 may be formed of a second opaque conductive layer OL2, and an insulating layer is disposed between the first opaque conductive layer OL1 and the second opaque conductive layer OL2 for electrically insulating the first opaque conductive layer OL1 from the second opaque conductive layer OL2, so that one of the opaque traces OT3 and one of the opaque traces OT74 overlapping each other are not electrically connected to each other. The insulating layer may be formed of, for example, an insulating material formed by a deposition process, a film and an adhesive layer or a film. The first opaque conductive layer OL1 may be located on or under the first transparent conductive layer TL1 forming the first transparent traces TT71, and the second opaque conductive layer OL2 may be located on or under the second transparent conductive layer TL2 forming the first electrode series ES1 and the second electrode series ES2. It is noted that since the conventional first connecting region is designed to avoid damaging the first opaque conductive layer and the second opaque conductive layer due to the laser cutting step, the conventional first connecting region is designed to be separated from the conventional second connecting region, and the conventional second connecting region are arranged along the second direction D2. Accordingly, the width of the opaque region OR on the first side S1 of the light-transmitting region TR is limited by the size of the conventional first connecting region. However, the laser cutting process for forming the first opaque conductive layer OL1 and the second opaque conductive layer OL2 in this embodiment does not damage the insulating layer therebetween, so one of the first connecting regions CR1 may overlap the corresponding second connecting region CR2. Through this overlapping design, the first connecting regions CR1 of this embodiment can be arranged along the first direction D1, thereby shortening a spacing between the first side S1 of the light-transmitting region TR and the corresponding edge of the substrate Sub to reduce the area of the opaque region OR on the first side S1 of the light-transmitting region TR.

Figure 15A:
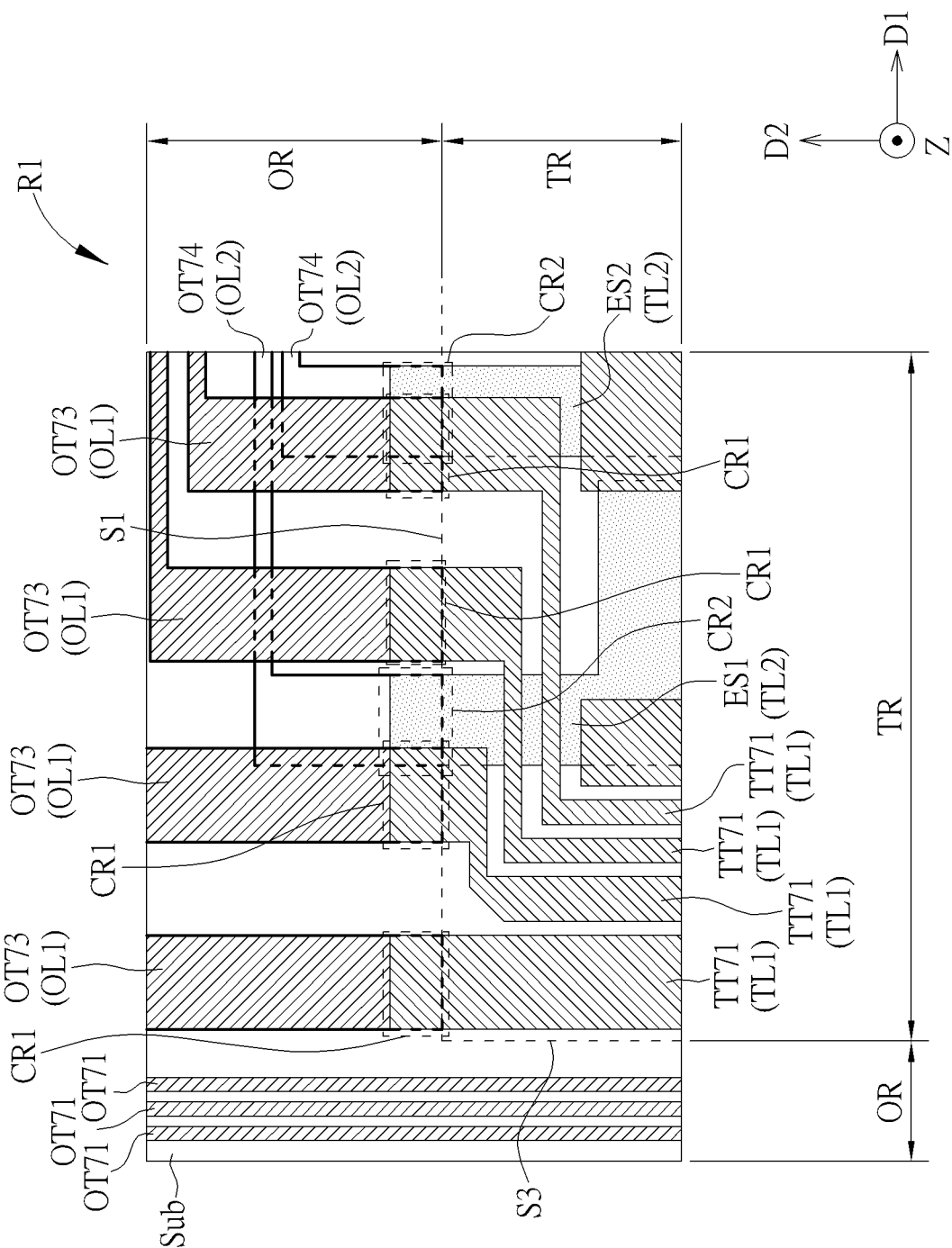
FIGS. 15A to 15D schematically illustrate enlarged views of regions R1, R2, R3 and R4 in FIG. 14, respectively.
Figure 15B:
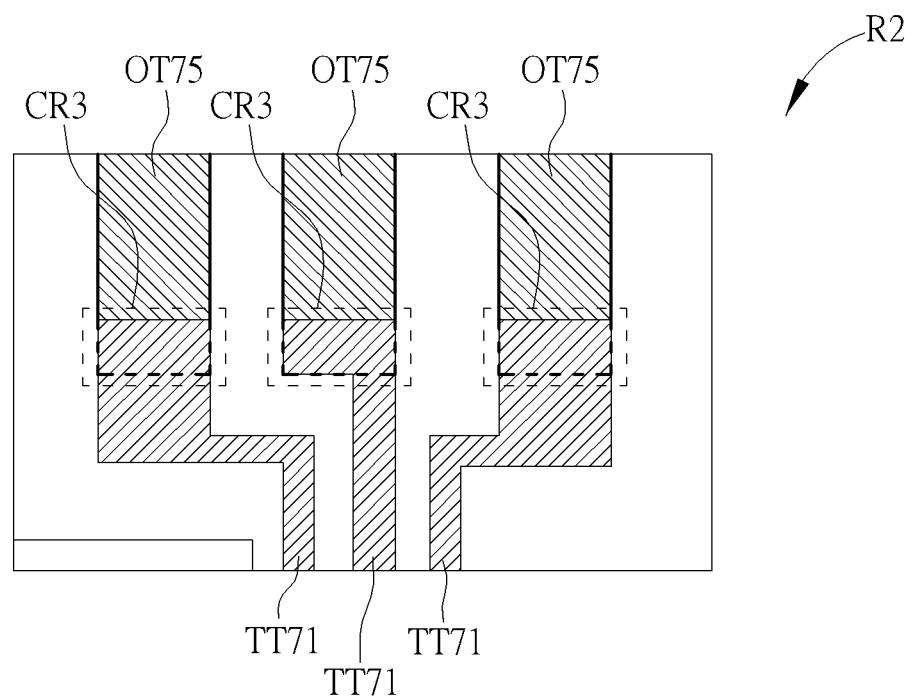
Figure 15C:
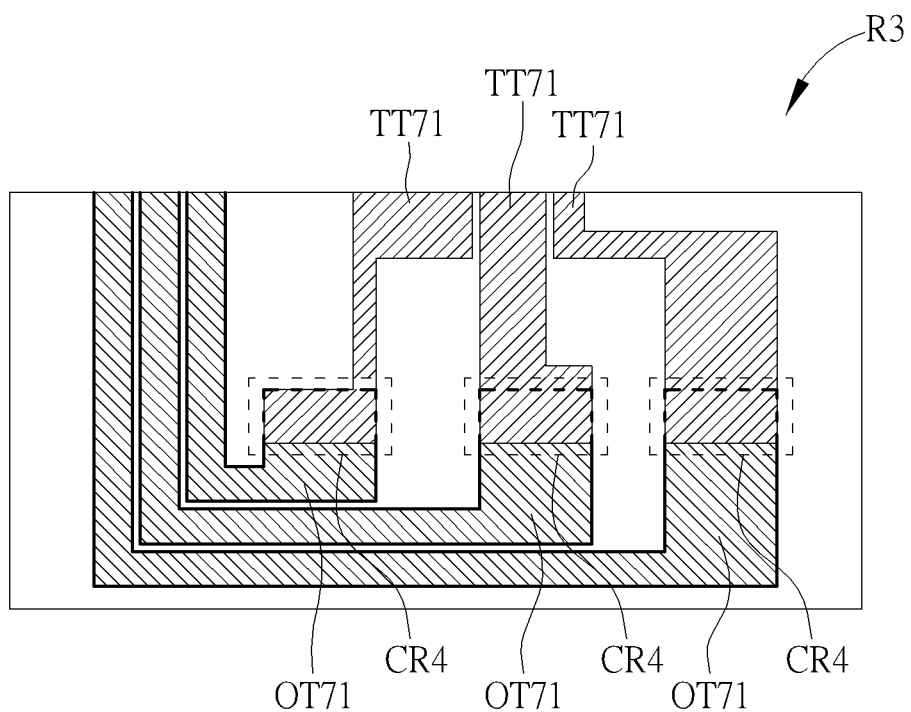
Figure 15D:
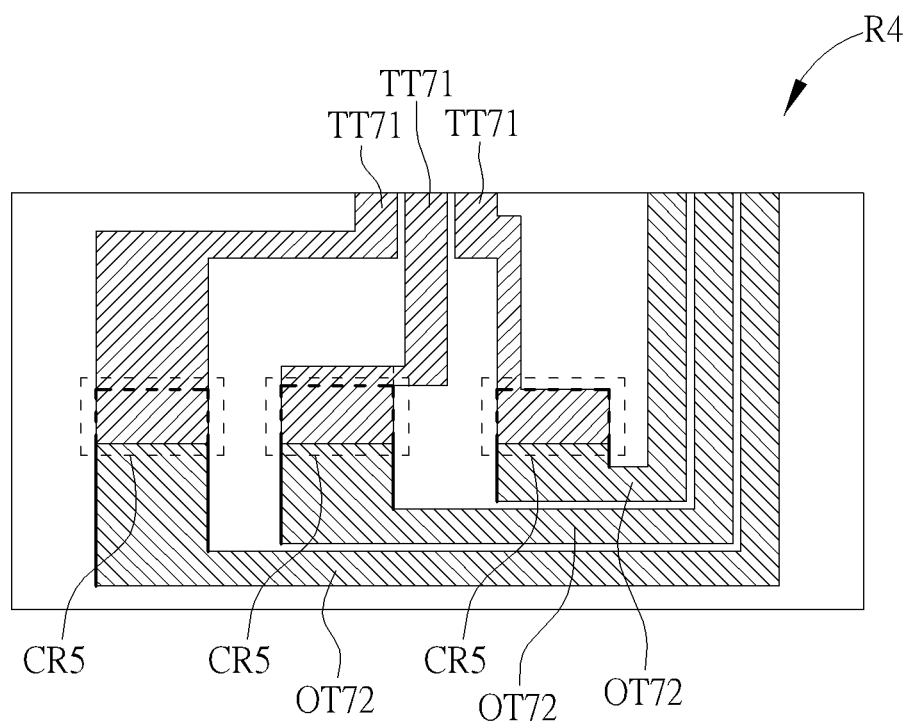

As shown in the region R2 of FIG. 15B, the touch panel TP7 further includes a plurality of opaque traces OT75, and each of which is connected to an end of the corresponding first transparent trace TT71 (e.g., the first transparent trace TT71 disposed in the peripheral region RP adjacent to the fourth side S4 of the light-transmitting region TR and extending from the first side S1). Each opaque trace OT75 and the corresponding first transparent trace TT71 have a third connecting region CR3, and the third connecting regions CR3 may also be arranged along the first direction D1. For example, the width of the opaque region OR located on the first side S1 of the light-transmitting region TR in the second direction D2 may be reduced to less than 2.5 millimeters. Similarly, as shown in a region R3 of FIG. 15C and a region R4 of FIG. 15D, each opaque trace OT71 and the corresponding first transparent trace TT71 disposed in the peripheral region RP adjacent to the third side S3 of the light-transmitting region TR and extending from the second side S2 have a fourth connecting region CR4, and the fourth connecting regions CR4 may also be arranged along the first direction D1. Each opaque trace OT72 and the corresponding first transparent trace TT71 disposed in the peripheral region RP adjacent to the fourth side S4 of the light-transmitting region TR and extending from the second side S2 have a fifth connecting region CR5, and the fifth connecting regions CR5 may also be arranged along the first direction D1. Thus, the area of the opaque region OR located on the second side S2 of the light-transmitting region TR can be further reduced.

In summary, in the touch panel of the present invention, the transparent traces electrically connected to the electrode strip sets respectively are formed of transparent conductive materials, so that the transparent traces can be disposed in the light-transmitting region. Thus, the width of the light-transmitting region can be increased, and the number of opaque traces disposed on the left and right sides of the light-transmitting region can be reduced, thereby reducing the width of the opaque region and the border width of touch panel. In addition, since transparent traces made of transparent conductive materials are easy to have obviously different equivalent resistances due to different lengths, the difference between the equivalent resistances of the transparent traces is obvious. For this reason, in the touch panel of the present invention, by means of designing the length of the winding segment of one of the transparent trace connected to the electrode strip set closer to the first side and/or the second side of the light-transmitting region to be longer than the length of the winding segment of another one of the transparent traces connected to the electrode strip set farther from the first side and/or the second side of the light-transmitting region, or widening the line width of the lead portion of the transparent trace connected to the electrode strip set farther from the first side and/or the second side of the light-transmitting region, the difference between the equivalent resistances of the lead portions of the transparent traces can be compensated, thereby uniforming the equivalent resistances of the transparent traces and reducing the phenomenon of uneven touch signals caused by different equivalent resistances of the transparent traces.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, having a light-transmitting region and an opaque region, the opaque region comprising a pad region disposed on a first side of the light-transmitting region, and the touch panel comprising:
   a plurality of electrode strip sets, disposed in the light-transmitting region and extending along a first direction, wherein the electrode strip sets comprise a first electrode strip set and a second electrode strip set, and the first electrode strip set is disposed between the second electrode strip set and the pad region;
   a plurality of first transparent traces, disposed in the light-transmitting region, each first transparent trace comprising a resistance adjusting portion, electrically connected to an end of a corresponding one of the electrode strip sets, two of the resistance adjusting portions being electrically connected to the first electrode strip set and the second electrode strip set respectively, and each of the two of the resistance adjusting portions comprises a winding segment, wherein a length of one of the winding segments electrically connected to the first electrode strip set is longer than a length of another one of the winding segments electrically connected to the second electrode strip set; and
   a plurality of electrode series sets, disposed in the light-transmitting region and extending along a second direction different from the first direction, and the electrode series sets crossing the electrode strip sets.

2. The touch panel according to claim 1, wherein the light-transmitting region has a second side opposite to the first side, and the first transparent traces connected to the first electrode strip set and the second electrode strip set extending to the first side, wherein the electrode strip sets further comprises a third electrode strip set, closer to second side than the first side, and one of the first transparent traces connected to the third electrode strip set extending to the second side.

3. The touch panel according to claim 2, further comprising at least one opaque trace, disposed in the opaque region and connected to the one of the first transparent traces connected to the third electrode strip set, and the one of the first transparent traces is disposed between the opaque trace and the electrode strip sets.

4. The touch panel according to claim 2, wherein the electrode strip sets further comprises a fourth electrode strip set, disposed between the third electrode strip set and the second side, another one of the first transparent traces is electrically connected to the fourth electrode strip set, each of the one and the another one of the first transparent traces comprises another winding segment, and a length of one of the another winding segments electrically connected to the fourth electrode strip set is longer than a length of another one of the another winding segments electrically connected to the third electrode strip set.

5. The touch panel according to claim 2, wherein the electrode strip sets further comprises a fifth electrode strip set adjacent to the first electrode strip set, and the electrode strip sets are disposed between another one of the first transparent traces connected to the first electrode strip set and another one of the first transparent traces connected to the fifth electrode strip set.

6. The touch panel according to claim 1, wherein the electrode strip sets further comprises a sixth electrode strip set, the first electrode strip set and the second electrode strip set are disposed between the sixth electrode strip set and the pad region, and one of the first transparent traces electrically connected to the sixth electrode strip set has no winding segment.

7. The touch panel according to claim 1, wherein each first transparent trace further comprises a lead portion extending into the opaque region from an end of a corresponding one of the resistance adjusting portions.

8. The touch panel according to claim 7, wherein a length of one of the lead portions electrically connected to the first electrode strip set is shorter than a length of another one of the lead portions electrically connected to the second electrode strip set.

9. The touch panel according to claim 7, wherein a line width of one of the lead portions connected to the first electrode strip set is less than a line width of another one of the lead portions connected to the second electrode strip set.

10. The touch panel according to claim 1, wherein the electrode strip sets and the first transparent traces are formed of a transparent conductive layer.

11. The touch panel according to claim 1, wherein widths of the resistance adjusting portions in the first direction are substantially equal to each other.

12. The touch panel according to claim 1, wherein each electrode strip set comprises two electrode strips spaced apart from each other.

13. The touch panel according to claim 12, wherein each electrode strip comprises a plurality of shielding portions, and a width of each resistance adjusting portion in the first direction is substantially equal to a width of each shielding portion in the first direction.

14. The touch panel according to claim 1, wherein each electrode series set comprises a first electrode series and a second electrode series, each first electrode series comprises a plurality of first connecting segments, each second electrode series comprises a plurality of second connecting segments, and one of the resistance adjusting portions overlaps one of one of the first connecting segments and one of the second connecting segments.

15. The touch panel according to claim 1, further comprising a plurality of second transparent traces, each of which being connected to another end of the corresponding one of the electrode strip sets.

16. The touch panel according to claim 1, wherein a length of the one of the winding segments electrically connected to the first electrode strip set and a length of the another one of the winding segments electrically connected to the second electrode strip set are determined according to a difference between an equivalent resistance of one of the first transparent traces electrically connected to the first electrode strip set and an equivalent resistance of another one of the first transparent traces electrically connected to the second electrode strip set.

17. The touch panel according to claim 1, wherein each first transparent trace further comprises a lead portion extending into the opaque region along the second direction, one of the lead portions comprises a first part and a second part, and a width of the first part in the first direction is different from a width of the second part in the first direction.

18. The touch panel according to claim 17, wherein two of the first transparent traces connected to adjacent two of the electrode strip sets are disposed on two sides of the electrode strip sets opposite to each other.

19. The touch panel according to claim 18, wherein a width of the first part is greater than a width of the second part, and the first part is closer to one of the electrode strip sets electrically connected to the first part and the second part than the second part.

20. The touch panel according to claim 17, wherein two of the first transparent traces connected to adjacent two of the electrode strip sets are disposed on a same side of the electrode strip sets, the first part is connected between the second part and one of the electrode strip sets electrically connected to the first part and the second part, and a spacing between the first part and another one of the electrode strip sets adjacent to the one of the electrode strip sets electrically connected to the first part is greater than a spacing between the second part and another one of the lead portions electrically connected to the another one of the electrode strip sets.

21. The touch panel according to claim 1, further comprising a plurality of first opaque traces disposed in the opaque region on the first side of the light-transmitting region, and each first opaque trace is connected to an end of a corresponding one of the first transparent traces, wherein each first opaque trace and the corresponding one of the first transparent traces have a first connecting region, and the first connecting regions are arranged along the first direction.

22. The touch panel according to claim 21, further comprising a plurality of second opaque traces disposed in the opaque region on the first side of the light-transmitting region, wherein each electrode series set comprises a first electrode series and a second electrode series, each second opaque trace is electrically connected to one of the first electrode series and the second electrode series, each second opaque trace and one of a corresponding one of the first electrode series and a corresponding one of the second electrode series have a second connecting region, and one of the second connecting regions overlap one of the first connecting regions.

23. The touch panel according to claim 1, wherein each electrode strip set comprises a plurality of electrode portions, each electrode portion comprises a plurality of strip portions, each electrode series set comprises a plurality of electrodes, each electrode portion overlaps a corresponding one of the electrodes, a line width of each strip portion of one of the electrode portions closest to the first transparent traces is greater than a line width of each strip portion of another one of the electrode portions not closest to the first transparent traces.

24. The touch panel according to claim 1, wherein each first transparent trace extends to the first side of the light-transmitting region from the end of the corresponding one of the electrode strip sets.

* * * * *